United States Patent
Clifton et al.

(10) Patent No.: US 10,032,484 B2
(45) Date of Patent: Jul. 24, 2018

(54) DIGITAL VIDEO BUILDER SYSTEM WITH DESIGNER-CONTROLLED USER INTERACTION

(71) Applicant: Animoto Inc., San Francisco, CA (US)

(72) Inventors: Thomas M. Clifton, New York, NY (US); Stephen J. Clifton, Jersey City, NJ (US); Tim Wharton, Keighley (GB); Krister Wombell, The Nexus (SG); Brian Rhee, Brooklyn, NY (US); Peter Sharp, Brooklyn, NY (US)

(73) Assignee: Animoto Inc., San Francisco, CA (US)

( * ) Notice: Subject to any disclaimer, the term of this patent is extended or adjusted under 35 U.S.C. 154(b) by 0 days.

(21) Appl. No.: 15/249,089

(22) Filed: Aug. 26, 2016

(65) Prior Publication Data
US 2017/0062009 A1 Mar. 2, 2017

Related U.S. Application Data

(60) Provisional application No. 62/211,212, filed on Aug. 28, 2015.

(51) Int. Cl.
*G11B 27/034* (2006.01)
*G11B 27/031* (2006.01)
(Continued)

(52) U.S. Cl.
CPC ........ *G11B 27/031* (2013.01); *G06K 9/00718* (2013.01); *G06K 9/00765* (2013.01); *G11B 27/034* (2013.01); *H04N 5/76* (2013.01)

(58) Field of Classification Search
CPC .......... G06K 9/00718; G06K 9/00765; G11B 27/031; G11B 27/034; H04N 5/76
(Continued)

(56) References Cited

U.S. PATENT DOCUMENTS

| 8,705,139 B1 | 4/2014 | Snyder |
| 2003/0095135 A1 | 5/2003 | Kaasila |

(Continued)

OTHER PUBLICATIONS

Wikipedia, "Line Wrap and Word Wrap", https://en.wikipedia.org/wiki/Line_wrap_and_word_wrap, dated May 11, 2016, 7 pages.
(Continued)

*Primary Examiner* — Thai Tran
*Assistant Examiner* — Stephen Smith
(74) *Attorney, Agent, or Firm* — Hickman Palermo Becker Bingham LLP; Adam C. Stone

(57) ABSTRACT

A digital video builder system with methodology for designer-controlled user interaction is described. In one embodiment, for example, a method comprises receiving, from interactive controls on a graphical user interface, configuration of a storyboard block of a storyboard of a target digital video to be created. The storyboard block represents a scene of the target digital video, comprises a media element slot and a scene parameter for configuring the media element slot, and corresponds to a scene specification having a plurality of scene variants for rendering the scene of the target digital video. The received configuration comprises a setting for the scene parameter. Based on the scene parameter setting, the method further includes automatically selecting one of the plurality of scene variants for use in rendering as part of the scene of the target digital video.

22 Claims, 17 Drawing Sheets

(51) Int. Cl.
*G06K 9/00* (2006.01)
*H04N 5/76* (2006.01)

(58) Field of Classification Search
USPC .......................... 386/278–290; 715/719–726
See application file for complete search history.

(56) References Cited

U.S. PATENT DOCUMENTS

| | | |
|---|---|---|
| 2004/0027369 A1 | 2/2004 | Kellock |
| 2004/0119715 A1 | 6/2004 | Everett |
| 2007/0030272 A1 | 2/2007 | Dowling |
| 2008/0016114 A1 | 1/2008 | Beauregard |
| 2008/0019610 A1 | 1/2008 | Matsuzaka |
| 2009/0300480 A1* | 12/2009 | Cohen .................. G11B 27/034 715/234 |
| 2010/0021125 A1* | 1/2010 | Ingrosso .............. G11B 27/031 386/278 |
| 2010/0153520 A1* | 6/2010 | Daun .................. G11B 27/034 709/218 |
| 2010/0281383 A1* | 11/2010 | Meaney ................. G11B 27/34 715/723 |
| 2011/0052154 A1 | 3/2011 | Weber |
| 2011/0119573 A1 | 5/2011 | Rudolph |
| 2012/0060095 A1* | 3/2012 | Klappert ............. H04N 21/458 715/722 |
| 2012/0131437 A1 | 5/2012 | Zhu |
| 2012/0198338 A1 | 8/2012 | Flint |
| 2013/0125000 A1* | 5/2013 | Fleischhauer ........ G11B 27/031 715/723 |
| 2014/0133834 A1* | 5/2014 | Shannon ................. H04N 9/80 386/278 |
| 2014/0237065 A1 | 8/2014 | Kloba |
| 2014/0320540 A1 | 10/2014 | Deach |
| 2015/0078733 A1* | 3/2015 | Popkiewicz ........... G06Q 30/02 386/278 |
| 2015/0294687 A1 | 10/2015 | Buick |
| 2016/0196044 A1 | 7/2016 | McGill |
| 2016/0293216 A1* | 10/2016 | Tost ...................... H04L 65/605 |
| 2017/0011264 A1 | 1/2017 | Smolic |
| 2017/0091558 A1* | 3/2017 | Smolic ............... G06K 9/00744 |

OTHER PUBLICATIONS

Stupeflix, Make videos online with photos, clips, musicm, https://studio.stupeflix.com/en/, dated Jun. 8, 2016, 1 page.
Shakr—Online Video Maker, https://www.shakr.com/, dated Jun. 8, 2016, 1 page.
Paths—SVG 1.1 (Second Edition), W3C Recommendation, dated Aug. 16, 2011, https://www.w3.org/TR/SVG/paths.html#PathData, 46 pages.
Litherum: End-To-End Tour of Text Layout/Rendering, http://litherum.blogspot.com/2015/02/end-to-end-tour-of-text-rendering.html, dated Feb. 27, 2015, 9 pages.
Glyph Metrics, FreeType Glyphs Conventions/III, Baseline, Pens and Layouts, https://www.freetype.org/freetype2/docs/glyphs/glyphs-3.html, dated Dec. 7, 2014, 6 pages.
Canva, Amazingly Simple Graphic Design Software, https://www.canva.com/, dated Jun. 8, 2016, 1 page.
Adobe Spark, "Communicate with Impact", https://spark.adobe.com/,dated Jun. 8, 2016, 1 page.
Wombell, U.S. Appl. No. 15/177,632, filed Jun. 9, 2016, Notice of Allowance.
Wombell, U.S. Appl. No. 15/177,632, filed Jun. 9, 2016, Notice of Allowance dated Mar. 15, 2018.
Wharton, U.S. Appl. No. 15/249,276, filed Aug. 26, 2016, Notice of Allowance dated Apr. 23, 2018.

* cited by examiner

DIGITAL VIDEO BUILDER SYSTEM WITH DESIGNER-CONTROLLED USER INTERACTION

CROSS-REFERENCE TO RELATED APPLICATION

This application claims the benefit of Provisional Appln. 62/211,212, filed Aug. 28, 2015, the entire contents of which is hereby incorporated by reference as if fully set forth herein, under 35 U.S.C. § 119(e).

TECHNICAL FIELD

The subject innovations relate generally to creating customized professional-quality digital videos with sophisticated and visually appealing computer animation effects and, more specifically, to a digital video builder system with methodology for designer-controlled user interaction.

BACKGROUND

One of the primary benefits of digital video is the ability reach an audience without worrying about film projection equipment. For example, a playable digital video file can be sent to others as an attachment to an electronic mail message or made viewable to visitors of a web site. As a result, business, corporations, and other organizations often use digital video to convey a message. For example, a corporation may create a digital video for training staff, instruction and safety, company promotion/branding, a new product or service launch, technology and product demonstration, or other purpose. Unfortunately, creating customized professional-quality digital videos that are visually appealing and dynamic is currently still an expensive and time-consuming proposition. This is largely because of the expertise and skill required to create them.

One way for an organization to create a customized digital video is to hire a professional digital video production firm. While such firms are capable of creating customized professional-quality digital videos, they may charge a significant amount for doing so. For example, at current rates, a firm may charge between $2,500 USD and $10,000 USD for creating a two to three-minute web-based corporate video presentation. Such cost may be daunting, if not prohibitive, for many organizations, especially small businesses.

Another way for an organization to create a customized digital video is to use professional video editing and effects software. One example of professional video editing and effects software is known as After Effects and is commercially available from Adobe Systems of San Jose, Calif. Unfortunately, professional video editing and effects software typically requires significant expertise to operate effectively and efficiently. For example, professional video editing and effects software may require a user to understand complex computer animation concepts such as layering, key framing, masking, motion tracking, and compositing.

There exist digital video creation systems that allow a lay user to create an animated digital video without needing the experience and expertise of a professional digital video editing and effects designer. Many of these systems employ a template system in which the user selects a desired template and supplies static media elements (e.g., digital photos and text) to fill available media element slots in the selected template. These systems then create a digital video based on a selected template and with user-supplied media elements. While such systems may be useful for creating animated slideshows and the like, such systems typically do not provide the level of control desired by users for many digital video creation tasks such as, for example, when creating a business or corporate video. In many cases, these systems only allow the user to specify the static media elements and the order in which they will appear in the video. Such limited user control may not be sufficient for creating a custom digital video that meets the requirements at hand.

What is needed, then, is an innovation in the state of art of digital video creation systems that allows lay users to create customized professional-quality digital videos with greater control over the appearance of the video than is provided by existing template-based digital video creation systems while at the same time not requiring the lay user to possess the experience and expertise of a professional digital video editing and effects designer.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF SUMMARY OF THE INVENTION

A digital video builder system with methodology for designer-controlled user interaction is described. The claims section at the end of this document provides a useful summary of some embodiments of the subject innovations.

DETAILED DESCRIPTION

Figure 1:
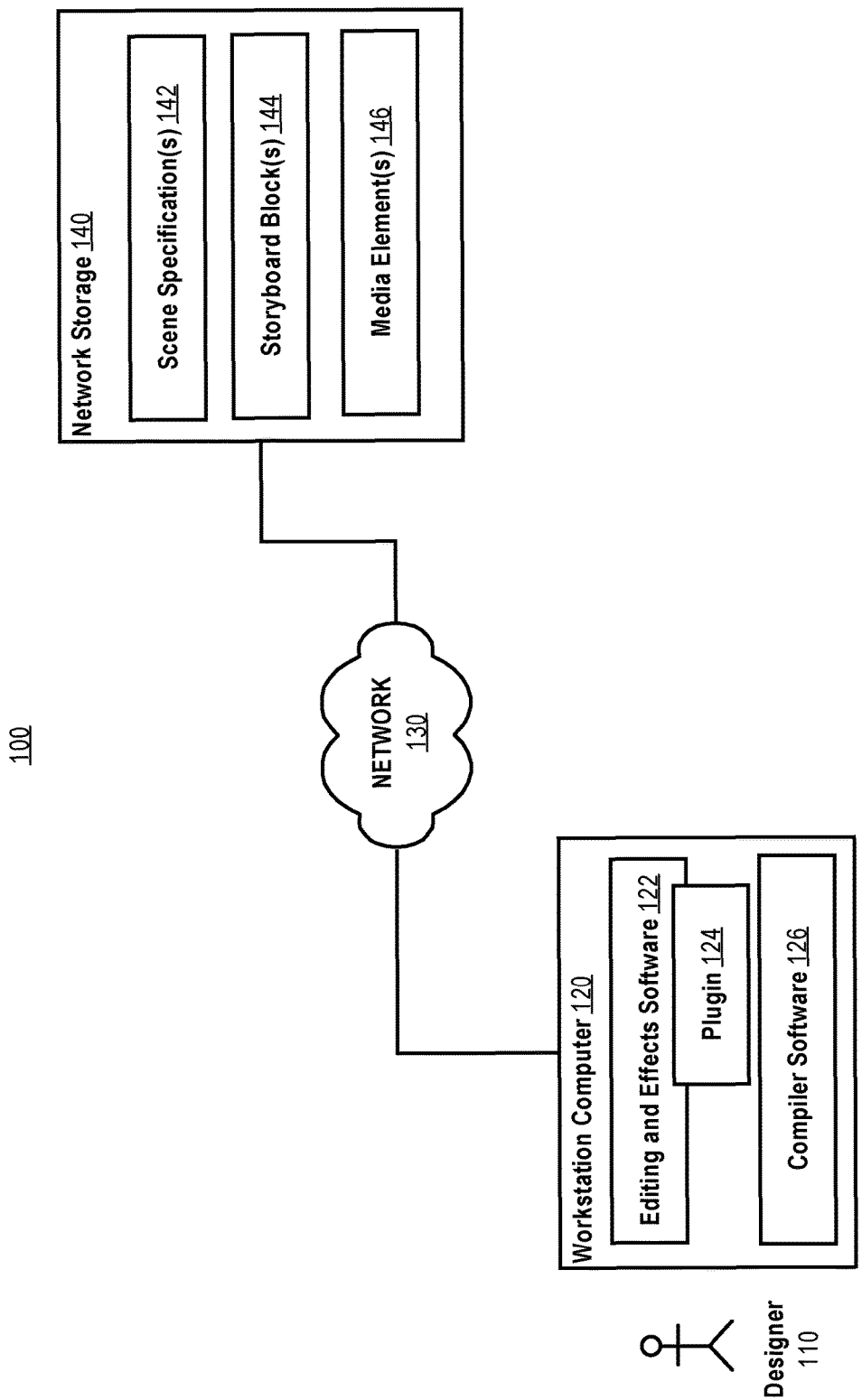
FIG. 1 illustrates a system environment in which a design phase may take place in accordance with an embodiment of the subject innovations.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In accordance with the subject innovations, the template-based approach for digital video creation is extended to allow designer-controlled user interaction. In particular, the extended approach provides the lay user greater control over the appearance of a target digital video within designer-specified constraints. The greater control extends beyond simply what media elements appear in the video, and the order in which they appear, to aspects such as, for example, how many scenes appear in the video, what types of scenes appear in the video, the display position of media elements during scenes, and the layout of media elements in scenes. Central to any digital video creation system is ability for a user to configure how the target digital video will appear. The digital video builder system of the subject innovations provides this capability in a manner that does not overwhelm the lay user with options for configuring the appearance of the target video while at the same time enabling the lay user to create customized professional-quality digital videos with sophisticated and visually appealing computer animation effects, as configured by an expert digital video editing and effects designer, and within the designer's specified constraints.

In accordance with one usage scenario, creation of a target digital video by the digital video builder system of the subject innovations involves a design phase, a configuration phase, and a rendering phase. The design phase and the configuration phase are operated by human users of the builder system. The rendering phase is automated by the builder system.

Design Phase

During the design phase, a human designer uses professional digital editing and effects software to create one or more "scene specifications." A scene specification may be defined generally as instructions and metadata for use during the rendering phase for automatically rendering a scene of the target digital video. A scene may be defined generally as a continuous portion of the target digital video. A scene typically, but not always, has a relatively short duration (e.g., less than 10 seconds), a visual transition from the preceding scene to the scene (e.g., a cut to the scene), if there is a preceding scene in the target digital video, and a visual transition from the scene to the next scene (e.g., a fade to the next scene), if there is a next scene in the target digital video.

At a minimum, a scene specification includes a scene graph representing the two-dimensional or three-dimensional scene designed by the designer. The scene graph may represent, for example, the objects in the scene, their drawable geometry and material properties (e.g., color, shading, etc.), spatial groupings of the objects, settings of the position of the objects, animations of the objects, and/or definitions of logical relationships between the objects. Some objects represented in the scene graph may be automatically replaced during the rendering phase with a media element such that the scene is rendered as part of the target digital video with the media element in the scene in place of the object. Such objects are referred herein as "media element placeholders" or just "placeholders."

Further, the professional digital editing and effects software is configured with a software plugin known as the Variant Designer that allows the designer to create, during the design phase, different "variants" of a scene within a scene specification. A variant may be defined generally as a scene specification of a scene that differs in some way from one or more other scene specifications of the scene. A variant of a scene may be represented as a scene sub-graph of the scene graph in the scene specification for the scene. For example, the scene sub-graph may be labeled or tagged with a name or identifier of the variant so that the scene sub-graph represented by the variant can be identified using the name or identifier of the variant. For example, the designer may use the Variant Designer to design a scene that has two variants. In one variant, a foreground digital image is animated to slide up from the bottom of the screen to the top of the screen. In another variant, the foreground digital image is animated to fade into the center of the screen. While a scene specification may be composed of multiple variants, a scene specification that is not composed of multiple variants may be thought of as a scene specification composed of a single variant. Thus, the term "variant," as used herein, can refer to either one of the variants of a multi-variant scene specification or the variant of a single variant scene specification.

Variants give lay users the option of selecting different configurations of a scene without having to entirely design the variants themselves. Returning to the previous example, in accordance with subject innovations, during the configuration phase, the lay user may be presented, in a computer graphical user interface, with a choice of anchor positions for the foreground digital image during the scene including 1) at the top of the screen, or 2) in the center of the screen. If the lay user selects option 1), at the top of the screen, then the scene may be automatically rendered during the rendering phase according to the variant in which the foreground digital image is animated to slide up from the bottom of the screen to the top of the screen. On the other hand, if the lay user selects option 2), in the center of the screen, then the scene may be automatically rendered during the rendering phase according to the variant in which the foreground digital image is animated to fade in to the center of the screen.

As this simple example illustrates, variants allow the lay user to have some control over the appearance of a scene. For example, the lay user can decide whether the foreground image is anchored at the top of the screen or in the center of the screen during the scene. Further, this control of the lay user can be limited by designer-specified constraints to ensure the scene is visually appealing. For example, the designer may allow the foreground digital image to be placed only at the top of the screen or in the center of the screen to avoid obstruction of other media elements of the scene. Finally, variants allow the designer to retain creative control over the appearance of the scene depending on the options selected by the lay user. For example, the designer may decide that different animations are useful depending on whether the anchor position of a media element is at the top of the screen or in the center of the screen.

As exemplified by the previous example, animation variants allow a designer during the design phase to design different animations for media elements in a scene. However, the subject innovations are not limited to only animation variants and other types of variants are possible. Other possible types of variants described in greater detail below include layout variants and transition variants. Layout variants allow a designer to design, during the design phase, different media element layouts for a scene. Transition variants allow a designer to design, during the design phase, different scene transitions for a scene. Animation variants, layout variants, and transition variants are all described in greater detail below.

Also during the design phase, scene specifications created by the designer are compiled into corresponding lay user-configurable "storyboard blocks." Each storyboard block corresponds to one scene specification. Each storyboard block may include one or more media element slots and one or more configurable scene parameters. Each media element slot corresponds to a placeholder of the corresponding scene specification. Each media element slot may be filled by the lay user by providing a media element to fill the slot through corresponding graphical user interface interactive controls made available to the lay user during the configuration phase. Similarly, each of the configurable scene parameters may be configured by a lay-user through corresponding graphical user interface interactive controls made available to the lay-user during the configuration phase. Examples of configurable scene parameters include the anchor position of a media element, the size of a media element, and the color of a media element. In this description, the term "interactive controls" encompass a single graphical user interface control or multiple graphical user interface controls that may be activated by or interacted with by a user to provide user input. Such activation or interaction may be accomplished in a variety of different ways depending on the user input devices available at hand. Such user input devices may include, for example, physical keyboards, pointing devices (e.g., a mouse), and touch-sensitive surfaces (e.g., a touch screen display or a touch-sensitive touchpad). Non-limiting examples of interactive controls include actionable or interactive graphical user interface buttons, checkboxes, drop-down lists, images, icons, text boxes, and any graphical user interface element or widget that may be activated by or interacted with by a user to provide input.

Configuration Phase

In order to allow a lay user to create a customized professional-quality digital video based on scene specifications designed by designer, the subject innovations encompass as a digital video builder tool with a storyboard interface. By interacting with the storyboard interface, the lay user can add, delete, configure, and order specific storyboard blocks of an overall storyboard of the target digital video. Such configuration may include the lay user providing, by interacting with the storyboard interface, media elements to fill media element slots of specific storyboard blocks. Such configuration may also include the lay user configuring, by interacting with the storyboard interface, scene parameters of specific storyboard blocks within designer-specified constraints.

One example of a designer-specified constraint is a set of predefined anchor positions for a certain media element. For example, the designer may constrain the possible anchor positions for certain text to the top center of the screen or at the bottom center of the screen. By interacting with the storyboard interface, the lay user can select the top center anchor position or the bottom center anchor position for the text.

Another example of a designer-specified constraint is the maximum size of a certain media element. For example, the designer may constrain the maximum size of a certain foreground image to a specified pixel width and pixel height. If the lay user provides a digital image that exceeds the maximum size, then the digital image is scaled down or cropped to the fit within the maximum size specified by the designer.

There are just two examples of designer-specified constraints. In general, the designer-specified constraints provide the lay user some flexibility in configuring the appearance a scene of the target digital video but not in a way that would result in a visually unappealing scene according to the designer.

In accordance with an embodiment, the digital video builder tool also provides a preview rendering engine for generating a preview video of the target digital video. The lay user may invoke the preview rendering engine to view a preview of the target digital video before the target digital video is rendered during the rendering phase. The preview rendering engine may render the preview video based on the lay user's configuration of specific storyboard blocks. The digital video builder tool may also provide the preview video to the lay user after the preview video is rendered by the preview rendering engine. In this way, the lay user can view a preview of the target digital video before the target digital video is rendered during the rendering phase. If the appearance of the preview video is not the lay user's liking, the lay user may change the configuration of specific storyboard blocks and thereafter command the preview rendering engine to generate a new preview video based on the changed configuration. The process of changing storyboard block configuration, generating a preview video, and viewing the preview video may be repeated by the lay-user by interacting with the storyboard interface until the desired preview video is generated. Once the lay user has settled on a desired configuration of the storyboard blocks, the lay user may command, by interacting with the storyboard interface, a full rendering engine to generate the target digital video based on the current storyboard block configuration. Such command also initiates the rendering phase.

Rendering Phase

During the rendering phase, the target digital video is automatically generated by the full rendering engine. The rendering phase involves a pre-rendering configuration sub-phase. The pre-rendering configuration sub-phase involves configuring scene specifications, including selecting specific variants of the scene specifications, based on the media elements provided by the lay user and configuration of scene parameters by the lay user. The configured scene specifications are then rendered into the target digital video, which is then made available to the lay user (e.g., as a download from a web site).

According to an embodiment, selection of a variant of multiple possible variants for a designer is based on the anchor positions of the media elements in the scene as selected by the lay-user during the configuration phase. Returning to a previous example, if the lay user selects an anchor position for a foreground image to be at the top of the screen during a scene, then the scene may be automatically rendered during the rendering phase according to a variant in which the foreground digital image is animated to slide up from the bottom of the screen to the top of the screen. On the other hand, if the lay user selects an anchor position for the foreground image to be at the top of the screen during the scene, then the scene may be automatically rendered during the rendering phase according to a variant in which the foreground digital image is animated to fade in to the center of the screen.

Thus, the subject innovations simplify the task for the lay user of creating customized professional-quality digital videos. The subject innovations improve the human-machine interface by reducing the cognitive burden on, and knowledge required by, the lay user to create a customized professional-quality digital video. The subject innovations also improve the operation of computer systems because they enable lay users to create customized professional-quality digital videos more efficiently, thereby consuming less of the computing resources of the computer systems that employ the subject innovations and preserving more of the computing resources for executing other tasks.

Design Phase System Environment

Referring now to FIG. 1, it illustrates a system environment 100 in which the design phase may take place in accordance with an embodiment of the subject innovations. As shown, the design phase environment 100 includes a human designer 110 that uses a workstation computer 120. The workstation computer 120 is configured to execute professional digital video editing and effects software 122, including variant designer plugin 124 to the software 122, and scene specification compiler software 126. The workstation computer 120 is coupled to network storage 140 via a network 130. The network storage 140 stores one or more scene specifications 142 generated by the designer 110 using the video editing and effects software 142 with the variant designer plugin 124, one or more storyboard blocks 144 compiled by the compiler software 126 from the and one or more scene specifications 142, and one or more media elements 146 referenced by the one or more scene specifications 142 and the one or more storyboard blocks 144.

The designer 110 is generally a person with experience using the professional video editing and effects software 122 for creating scene specifications 142. The professional video editing and effects software 122, in a non-limiting embodiment, is the ADOBE® AFTER EFFECTS® software available from Adobe Systems of San Jose, Calif. The video editing and effects software 122 is configured with the variant designer plugin 124. The variant designer plugin 124 allows to the designer 110 using the video editing and effects software 112 to create scene specifications 142 with variants. Variant designer plugin 124 may interface with the editing and effects software 122 via an application programming interface (API) offered by the editing and effects software 122.

The workstation computer 120 may be desktop computing device, a laptop computing device, or other general-purpose computer configured to execute the professional video editing and effects software 122 with the variant designer plugin 124. The workstation computer 120 may include basic hardware components (e.g., CPU and memory) like those of basic computing device 1600 of FIG. 16 discussed below and a basic software system like software system 1700 of FIG. 17 discussed below configured to execute the video editing and effects software 122 with the variant designer plugin 124.

The network storage 130 may include a conventional data network such as, for example, a Local Area Network (LAN), a wireless LAN, a Wide Area Network (WAN), or the Internet.

The network storage 140 may be implemented by a conventional network storage mechanism or service. For example, network storage 140 may comprise one or more data storage devices operatively coupled to network 130. Each scene specification 142, storyboard block 144, and media element 146 may be stored as one or more files in the network storage 140.

Scene Specifications

Figure 2:
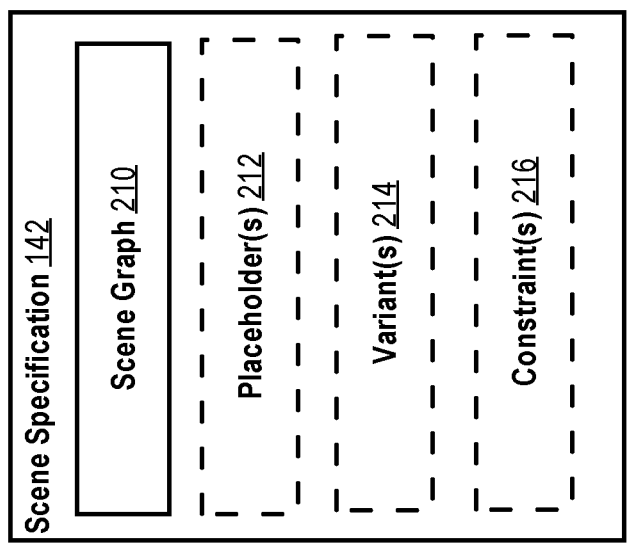
FIG. 2 illustrates a scene specification that may be created during the design phase in accordance with an embodiment of the subject innovations.

Turning now to FIG. 2, it is a block diagram of a scene specification 142 that may be created by the designer 110 using the editing and effects software 122 with the variant designer plugin 124. As shown, a scene specification 142 may include a scene graph 210, zero or more placeholders 212, zero or more variants 214, and zero or more designer-specified constraints 216. The scene specification 142 may be represented in various different data formats including human and machine-readable data formats such as, for example, eXtensible Markup Language (XML) format or Javascript Object Notation (JSON) format.

The scene graph 210 of a scene specification 142. The scene graph 210 comprises tree-structured data representing a two-dimensional or three-dimensional animated scene of a digital video. In particular, the tree data structure of the scene graph 210 may represent the objects in the scene, their draw-able geometry and material properties (e.g., color, shading, etc.), spatial groupings of the objects, settings of the position of the objects, animations of the objects, and/or definitions of logical relationships between the objects.

A placeholder 212 encompasses metadata about the scene graph 210 that identifies an object represented by the scene graph 210 that is replaceable with a media element provided by the lay-user when configuring the storyboard block 144 corresponding to the scene specification 142. The object may be a text object, a digital image object, or a video object.

A variant 214 encompasses metadata about the scene graph 210 that identifies (labels) a scene sub-graph of the scene graph 210. The scene sub-graph may represent the objects in the scene variant, their draw-able geometry and material properties (e.g., color, shading, etc.) in the scene variant, spatial groupings of the objects in the scene variant, settings of the position of the objects in the scene variant, animations of the objects in the scene variant, and/or definitions of logical relationships between the objects in the scene variant.

The constraints 216 encompass metadata about the anchor positions and size of media elements provided to fill placeholders 212 that are allowed by the designer. An anchor position of a media element refers to the media element's primary display position on the screen during the scene. For example, the primary position may correspond to the position where the media element starts the scene or the position where the media element ends up by the end of the scene. A constraint 216 may specify, for example, that a media element can be positioned only at certain specific locations on the screen.

Storyboard Blocks

Figure 3:
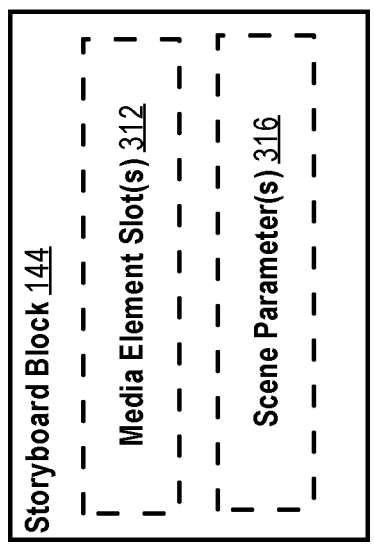
FIG. 3 illustrates a storyboard block that may be created during the design phase in accordance with an embodiment of the subject innovations.

Turning now to FIG. 3, it is a block diagram of a storyboard block 144 that may be generated by the compiler software 124 by compiling a corresponding scene specification 142 into the storyboard block 144. As shown, a storyboard block 144 may comprise, among other things, zero or more media element slots 312 and zero or more configurable scene parameters 316

Each media element slot 312 corresponds to one placeholder 212 of the corresponding scene specification 142. A media element slot 312 may be filled by a media element provided by the lay user when configuring the storyboard block 144 through the storyboard interface. The media element may be text, a digital image, a digital video, a graphic, or an icon depending on the type of the media element slot 312.

The configurable scene parameter(s) 316 correspond to the designer-specified constraint(s) 216 of the corresponding scene specification 142. The configurable scene parameter(s) 316 may be configured with actual values by the lay user when configuring the storyboard block 144 through the storyboard interface. For example, a configurable scene parameter 316 may allow the media element provided to fill a certain media element slot 312 to be anchored at one of three different screen positions and the lay user may select one of those three positions as an actual value for the parameter 316 by interacting with the storyboard interface.

Configuration and Rendering Phases System Environment

Figure 4:
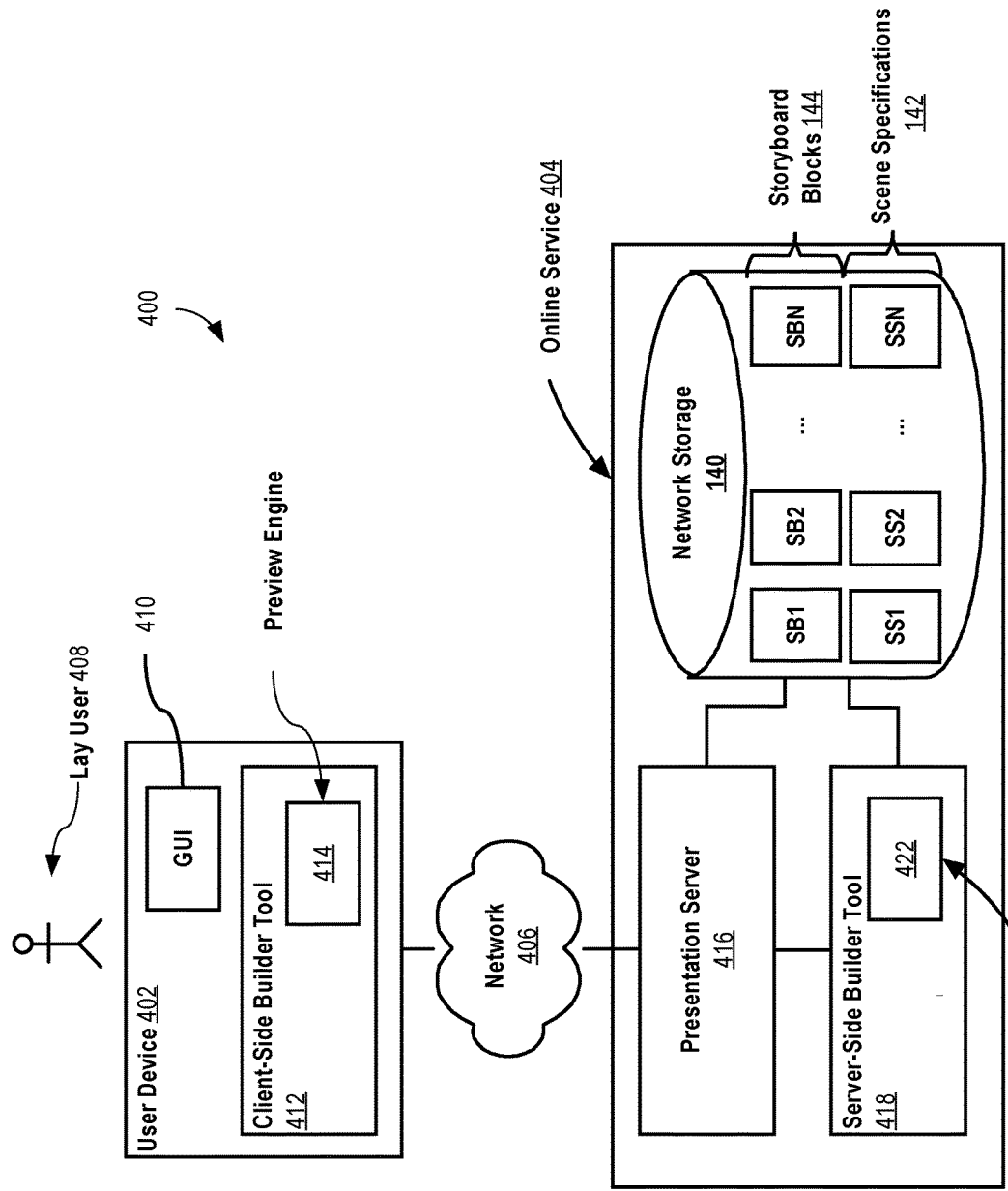
FIG. 4 illustrates a system environment in which a configuration phase and a rendering phase may take place in accordance with an embodiment of the subject innovations.

Turning now to FIG. 4, it is a block diagram of networked system environment 400 in which the configuration and rendering phases may take place in accordance with an embodiment of the subject innovations. Environment 400 includes a user device 402 coupled to an online service 404 via a data network 406.

User device 402 is used by lay user 408 and includes a graphical user interface 410 and a client-side portion 412 of the digital video builder tool. The client-side builder tool 412 includes preview rendering engine 414.

Online service 404 includes presentation server 416, a server-side portion of the digital video builder tool 418, and network storage 140. The server-side builder tool 418 includes full rendering engine 422. Network storage 140 stores one or more storyboard blocks 144 and one or more corresponding scene specifications 142.

Figure 16:
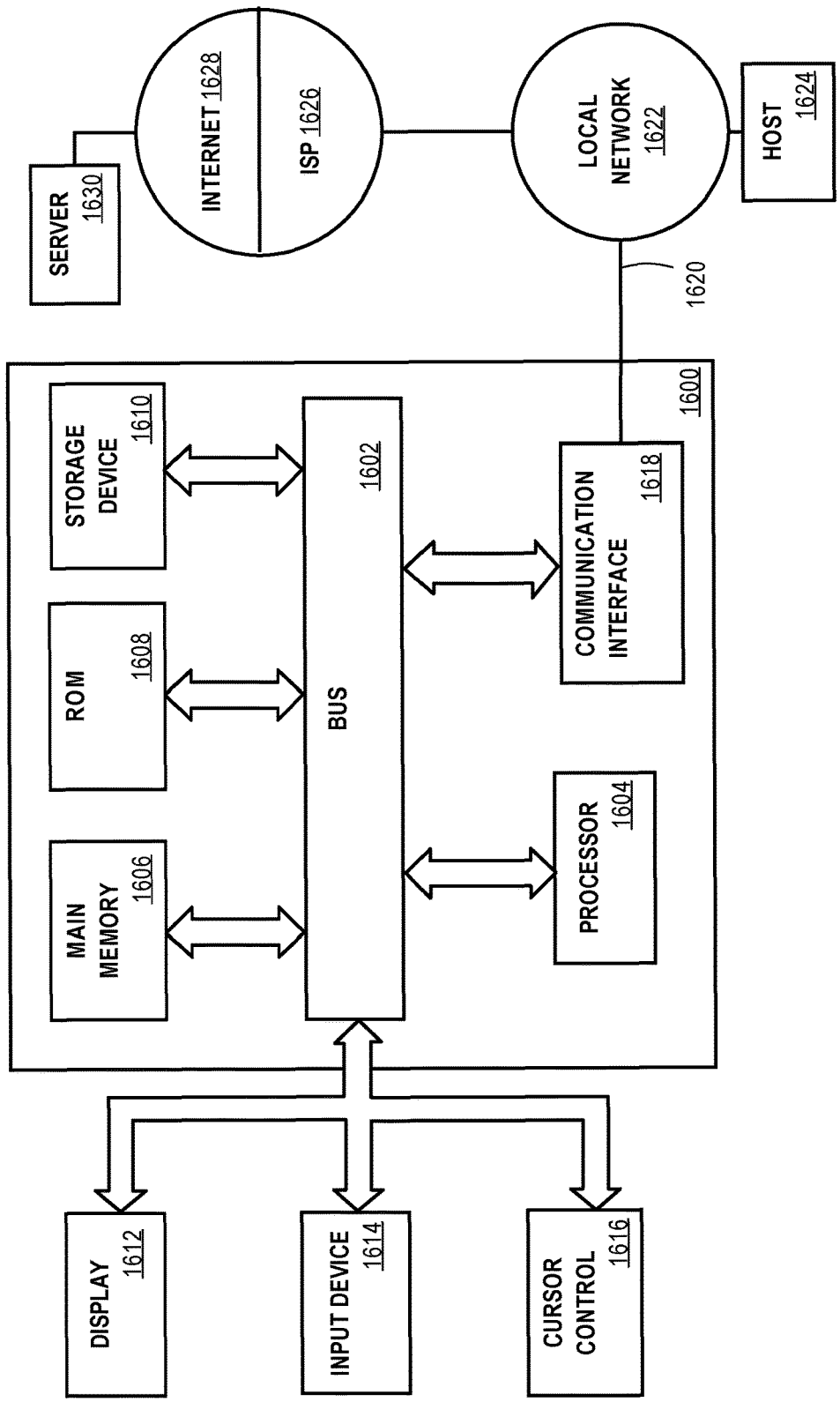
FIG. 16 is a block diagram of an example computer system suitable for implementing the digital video builder tool with storyboard interface of the present invention.

User device 402 may be a personal computing device under processor control (e.g., system 1600 of FIG. 16). User device 402 may be configured with an operating system (e.g., 1710 of FIG. 17) for driving graphical user interface 410 and executing client-side builder tool 412. For example, user device 402 may be a conventional laptop computer, a desktop computer, a tablet computer, or other conventional personal computer.

Online service 404 may be implemented by one or more server computing devices under processor control (e.g., computer system 1600 of FIG. 16). Each such server computing device may be configured with a software system (e.g., software system 1700 of FIG. 17) for controlling the operation of the server computing device. If online service 404 is implemented by multiple service computing devices, the server computing devices may be interconnected by one or more data networks (e.g., one or more Internet Protocol-based data networks) according to a distributed computing arrangement. For example, online service 404 may be an Internet web site that provides users the ability to automatically generate audiovisual works. In one non-limiting exemplary embodiment, online service 404 is the ANIMOTO® cloud-based video creation service, provided by Animoto Inc. of San Francisco, Calif., that produces animated digital videos from digital photos, video clips, and music.

Data network 406 may any data network suitable for facilitating Internet Protocol (IP)-based communication between user device 402 and online service 404. For example, data network 406 may be the Internet or other IP-based data network. Communication over data network 406 between client device 402 and online service 404 may occur according to a variety of different IP-based network communications protocol including, but not limited to, Hyper Text Transfer Protocol (HTTP) of the Hyper Text Transfer Protocol Secure (HTTPS).

Lay user 408 may be a human user of the user device 402 and the online service 404. For example, lay user 408 may be someone that holds a user account with the online service 404 against which the lay user 408 can be authenticated (e.g. by username and password combination provided by the user 408). Lay user 408 may pay a fee to use online service 404 for creating digital videos. For example, lay user 408 may pay a periodic subscription fee (e.g., monthly) or a per-video fee.

Graphical user interface 410 may include the storyboard interface of the digital video builder tool as disclosed herein. The storyboard interface may be presented within a graphical user interface window such as, for example, a web browser window or other graphical user interface window. Lay user 408 may interact with the graphical user interface 410 to provide input to the digital video builder tool using any conventional computer user input mechanisms, which may vary depending on the type of user device 402. For example, if the user device 402 is a desktop computer, then the input mechanisms may include a keyboard and a pointing device (e.g., a mouse). On the other hand, if the user device 402 is a tablet computer, then the input mechanisms may include a touch-sensitive surface (e.g., a touch screen display).

The digital video builder tool may have a client-side 412 that executes at the user device 402 and a server-side 418 that executes at the online service 404. The user device 402 may download the client-side 412 from the online service 404 over the data network 406. In exemplary embodiments, the client-side 412 is implemented by client-side web application instructions suitable for execution by a compatible web browser application that also executes on the user device 102. Such client-side web application instructions may include a combination of Hyper Text Markup Language (HTML), Cascading Style Sheet (CSS), and JAVASCRIPT® instructions. The web browser application may be a conventional industry standard web browser application such as, for example, GOOGLE® CHROME®, MICROSOFT® INTERNET EXPLORER®, or the like.

The client-side 412 may include the preview rendering engine 414 for rendering the digital video preview of the target video based on the lay user's current configuration of a set one or more storyboard blocks 144. In an exemplary embodiment, the preview rendering engine 414 is a WebGL-based rendering engine of a supporting web browser application. WebGL is a cross-platform, royalty-free web standard for a low-level 3D graphics API based on OpenGL ES 2.0, exposed through the HTML5 Canvas element as Document Object Model interfaces. For further description of WebGL, see e.g., "WebGL Specification," (Version 1.0.3, Oct. 27, 2014), from the Khronos Group. A copy of his specification is available via the Internet (e.g., currently at /registry/webgl/specs/1.0/ in the in the www.khronos.org domain).

Presentation server 416 is responsible for receiving and responding to network requests sent from user device 402 over data network 406. In doing so, presentation server 416 may interface with the server-side 418 of the digital video builder tool and network storage 140.

The server-side 418 of the builder tool is responsible for generating the target digital video. To do so, the server-side 418 may receive the current configuration of the set of storyboard block(s) 144 from the presentation server 416 which received the configuration from user device 402 over data network 406. Then, the server-side 418 configures the scene specification(s) 142 corresponding to the set of storyboard block(s) 144 according to the current configuration received from the user device 402. Next, the server-side 418 generates the target digital video using the full rendering engine 422 and the corresponding scene specification(s) 142 as configured with the current configuration. Once the target digital video has been generated, the presentation server 416 may send the target video (or a link to a server location where the target video is available for download) over the data network 406 to the user device 402.

Network storage 140 may store a library of scene specifications 142. The scene specifications 142 may be independent inter-changeable units that can be combined together by the server-side build tool 418 to form different audiovisual works. Each scene specification 142 may have a corresponding storyboard block 144. One or more of the scene specifications 142 and the one or more corresponding storyboard blocks 144 may be used in the generation of a given target video. In an embodiment, a scene specification 142 is created by a professional or highly skilled video effects designer using professional video editing and effects software and the corresponding storyboard block 144 is a compiled version of the scene specification 142. As mentioned, storyboard blocks 144 and scene specifications 142 may be stored in one or more files in network storage 140.

While only one user device and associated user are depicted in environment 400 for the purpose of providing a clear example, the online service 404 may support multiple user devices and multiple users in a typical implementation.

Storyboarding Process

Often, a digital video created by a user or an organization incorporates media elements that belong to the user or the organization. Such media elements may include, for example, still images, video clips, and text pertaining to the message intended to be conveyed by the digital video. The subject innovations encompass automatically creating a custom professional-quality digital video with animation effects using media element provided by a lay user (e.g., an employee or owner of a business).

In one embodiment, the digital video builder tool provides a storyboard-like graphical user interface. By interacting with the user interface, the lay user can add, delete, configure, and order specific storyboard blocks of a storyboard of the target digital video to be created. Each storyboard block represents a corresponding scene (i.e., a portion) of the target digital video. In response to the user's selection of a specific storyboard block, the lay user, by interacting with the user interface, can provide one or more media elements to be included in the corresponding scene. In addition, by interacting with the user interface, the user can configure any available configurable scene parameters of the specific storyboard block that control aspects of how the media elements appear in the corresponding scene. For example, a scene parameter of a storyboard block may allow the lay user, by interacting with the user interface, to configure the color, font, or orientation of a text media element that appears in the corresponding scene. Thus, according to embodiments of the subject innovations, the disclosed technologies provide lay-user configurable storyboard blocks representing scenes of the target digital video to be created.

According to some embodiments, sets of related storyboard blocks are grouped into storyboard templates. A storyboard, as used herein, refers to a set of one or more related storyboard blocks. A storyboard template, as used herein, refers to a storyboard in which the storyboard blocks of the storyboard are preconfigured in some manner. By interacting with the user interface, the user can select a specific storyboard template on which to base a storyboard for the target digital video to be created. In response to the user's selection of the specific template, the user interface displays visual representations of the preconfigured storyboard blocks associated with the specific template. The storyboard blocks may be preconfigured with stock media elements that provide the user a complete storyboard "out-of-the-box". By providing preconfigured storyboard blocks in the storyboard template, the lay user need only make the changes to the storyboard blocks of the selected template necessary to customize the storyboard to the lay user's liking. For example, in response to the lay user's selection of a specific storyboard block of a selected storyboard template, the user can replace one or more of the preconfigured media elements of the specific storyboard block with one or more media elements supplied by the lay user.

A goal of the digital video builder tool and associated storyboard interface is to simplify the task of creating custom professional-quality digital videos for the lay user. Such videos typically incorporate sophisticated computer animation techniques such as custom key framing, layering, blurring, transitions, and other animation techniques. In some cases, the timing of animation effects as they appear in the video is matched to a song beat or otherwise choreographed or synchronized to a musical or audio accompaniment to the video.

One way the digital video builder tool simplifies the task of creating a custom professional-quality digital video is to encapsulate information, used by a computerized rendering engine for rendering a scene of the target digital video with the animation effects, in a scene specification. By interacting with the user interface, the user can configure scene specifications used to render scenes of the target digital video with animation effects without worrying about how the scene specifications are configured to do so (e.g., without worrying about how the scene graph is structured). Instead, the digital video builder tool automatically applies, to scene specifications, the media elements and scene parameters that the lay user has provided through the user interface to configure the corresponding storyboard blocks. Then, the tool automatically renders the target digital video using the scene specifications and the media elements and scene parameters as automatically applied to them by the tool. In this way, the lay user is able to more easily create a custom professional-quality digital video that incorporates the user's own media elements and that presents the media elements in the video along with sophisticated computer animation effects.

According to some embodiments, the digital video builder tool includes a computerized preview rendering engine. By interacting with the user interface, the lay user may invoke the preview rendering engine to create a digital video preview of the target digital video to be created. The preview rendering engine creates the digital video preview based on the current configuration of the storyboard blocks of the current storyboard.

According to some embodiments, the preview rendering engine is lightweight in the sense that it may not render scenes of the digital video preview with all of the animation effects that will be included in the target digital video. Nevertheless, the digital video preview provides the lay user a useful simulation of the target digital video as it would appear if created based on the current configuration of the storyboard blocks of the current storyboard. For example, according to some embodiments, by playing the digital video preview, the lay user can see a static or a minimally animated visual representation of the scenes that currently would be included in the target digital video, the current playback order of these scenes, the playback time of each scene, and the media elements currently included in each scene.

According to some embodiments, the digital video builder tool includes a computerized full rendering engine. By interacting with the user interface, the lay user may invoke the full rendering engine to create the target digital video with full animation effects based on the current configuration state of the storyboard blocks. In response to the user's invocation of the full rendering engine, the current configuration of the storyboard blocks, including the media elements currently included in the storyboard blocks, are applied by the tool to corresponding predefined design animation modules. Each design animation module represents information for the full rendering engine to render a scene of the target digital video with the supplied media elements and with professional-quality animation effects. Applying the current configuration of a storyboard block to a corresponding to design animation module may include applying the user-supplied media element(s) of the storyboard block and the scene parameters of the storyboard block to the corresponding scene specification. By configuring a storyboard block as desired through the user interface, the lay user can indirectly configure a corresponding scene specification for rendering a scene of the target digital video with professional-quality animation effects without worrying about how to configure and instruct the full rendering engine to do so.

Thus, the subject innovations encompass technologies that simplify the task for the lay user of creating custom professional-quality digital videos. The subject innovations improve the human-machine interface by reducing the cognitive burden on, and knowledge required by, the lay user to create a custom professional-quality digital video. The subject innovations also improve the operation of computer systems because the subject innovations enable lay users to create custom professional-quality digital videos more efficiently, thereby consuming less of the computing resources of the computer systems that employ the subject innovations and preserving more of the computing resources for executing other tasks.

Media Elements

Scene specifications and storyboard blocks may be associated with various types of media elements. For example, a scene specification or a storyboard block may be associated with stock or lay user-supplied digital image. For example, the encoded data format of the digital image may be JEPG, GIF, TIFF, PNG, BMP, etc. A digital image is merely one example of a media element that may be associated with a scene specification or a storyboard block. Other types of media elements that may be associated with a scene specification or a storyboard block include digital videos and text. For example, the encoded data format of the digital video can be MPEG, AVI, MOV, ASF, WMV, REAL MEDIA, FLV, etc. The encoded data format of text may be ASCII, UTF-8, UNIICODE, etc.

A media element can be associated with a scene specification or a storyboard block in at least two different ways. In one way, a media element is associated with a scene specification or storyboard block as a stock media element providing by the designer when designing the scene specification. In another way, a lay user of the digital video builder tool associates a media element that the lay user provides with a storyboard block. For example, the lay user may use the digital video builder tool to replace a stock media element of a storyboard block with a lay user-provided one. The subject innovations enable a user to create a custom digital video by replacing stock media elements associated with storyboard blocks of a predefined storyboard template with lay user-supplied media elements.

The association between a scene specification or a storyboard block and a media element can be established in various different ways. In one way, the scene specification nor the storyboard block references the media element by an address or other location identifier of the media element. For example, a scene specification nor a storyboard block can reference a media element by an absolute or relative file system path name to a file that contains the media element or by an absolute or relative Uniform Resource Locator (URL) for a network location from which the media element can be downloaded from a server using an appropriate networking protocol (e.g., HTTP or HTTPS). In some cases, the media element itself is part of the data definition of the scene specification or the storyboard block. For example, a scene specification or a storyboard block may be associated with a text media element by storing the text as part of the data defining the storyboard block, as opposed to storing a reference to the media element.

Description herein referring a media element that is "associated" with a scene specification or a storyboard block includes implementations where the media element is part of the data definition of the scene specification or the storyboard block and implementations where the data definition of the scene specification or the storyboard block references the media element by an address or other location identifier of the media element (e.g., an absolute or partial URL).

Storyboard Templates

According to some embodiments, a storyboard template includes a set of storyboard blocks preconfigured with stock media elements. In other words, the storyboard template includes a complete storyboard from which the target digital video can be rendered and created by the full rendering engine. By enabling a lay user to start the video creation process from a completed storyboard, the lay user's task is simplified. In particular, instead of building a storyboard from scratch, the lay user can select a predefined storyboard template and modify the storyboard blocks of the template as needed until the desired storyboard is achieved. Since the number of user operations required to modify a predefined storyboard template for a desired digital video is typically far fewer than the number of operations to build the same storyboard from scratch, the lay user's task in storyboarding the target digital video is simplified by the subject innovations.

Scene Parameters

In addition to one or more media elements, a storyboard block may also be associated with one or more scene parameters. A scene parameter, as used herein, refers to an aspect of the scene represented by the storyboard block that is configurable by the lay user by interacting with the user interface of the digital video builder tool. When the scene is rendered by a rendering engine, the scene is rendered in accordance with any scene parameters of the corresponding storyboard block as configured by the lay user. For example, a scene parameter of a storyboard block may allow the lay user to set, by interacting with the user interface, the position, orientation, color, font, and font size of a text media element during the corresponding scene. As another example, a scene parameter of a storyboard block may allow the lay user to set, by interacting with the user interface, the color of a background on which a media element is displayed during the corresponding scene.

Storyboard Block Types

According to some embodiments, the storyboard interface of the digital video builder tool enables the lay user to configure a storyboard block that is one of various different predefined storyboard block types. Each different storyboard block type may incorporate different types of media elements in different configurations and have different scene parameters. A storyboard can include storyboard blocks all of the same storyboard block type, storyboard blocks all of different storyboard block types, or storyboard blocks in which some but not all are of the same storyboard block type. The predefined storyboard block types according to some embodiments may include all of the following types, or a subset or superset thereof:

TABLE 1

Predefined Storyboard block types

| Type | Description | Scene Parameter(s) |
|---|---|---|
| One Line | Use to create a scene with one line of text overlaid on a colored background. By interacting with the storyboard interface of the digital video builder tool, the lay user may provide the line of text and select the color for the background. | Text Alignment - Determines the general display screen alignment of the text when rendered in the scene. Options may include, for example, right, center, left, bottom, and top. |
| Multiple Lines | Use to create a scene with multiple lines of text overlaid on a colored background. By interacting with the storyboard interface of the digital video builder tool, the lay user may provide the multiple lines of text and select the color for the background. | Background Color - Determines the color of the background on which the text is displayed. For example, the Background Color may be specified as an RGB value or other color value. |
| Media Only | Use to create a scene with a digital image or digital video clip. By interacting with the storyboard interface of the digital video builder tool, the lay user may provide the digital image or digital video clip. | None |
| Media + One Line | Use to create a scene with one line of text overlaid on a digital image or a video clip. By interacting with the storyboard interface of the digital video builder tool, the lay user may provide the line of text and the digital image or digital video clip. | Text Alignment - Determines the general display screen alignment of the text when rendered in the scene. Options may include, for example, right, center, left, bottom, and top. |
| Media + Multiple Lines | Use to create a scene with multiple lines of text overlaid on a digital or video clip. By interacting with the storyboard interface of the digital video builder tool, the lay user may provide the multiple lines of text and the digital image or digital video clip. | Text Alignment - Determines the general display screen alignment of the text when rendered in the scene. Options may include, for example, right, center, left, bottom, and top. |
| Media + Caption | Use to create a scene with a caption overlaid on a digital image or a video clip. By interacting with the storyboard interface of the digital video builder tool, the lay user may provide the text for the caption and the digital image or digital video clip. | Caption Alignment - Determines the general display screen alignment of the caption when rendered in the scene. Options may include, for example, right, center, left, bottom, and top. |
| Logo | Use to create a scene with a digital image logo and caption text overlaid on a colored background. By interacting with the storyboard interface of the digital video builder tool, the lay user may provide the digital image logo, the text for the caption, and specify the background color. | Logo Image Alignment -- Determines the general display screen alignment of the digital image logo when rendered in the scene. Options may include, for example, right, center, left, bottom, and top. Caption Alignment - Determines the general display screen alignment of the caption when rendered in the scene. Options may include, for example, right, center, left, bottom, and top. Background Color - Determines the color of the background on which the text is displayed. For example, the Background Color may be specified as an RGB value or other color value. |

TABLE 1-continued

Predefined Storyboard block types

| Type | Description | Scene Parameter(s) |
| --- | --- | --- |
| Logo + Media | Use to create a scene with a digital image logo and caption text overlaid on a background digital image or a background video clip. By interacting with the storyboard interface of the digital video builder tool, the lay user may provide the digital image logo, the text for the caption, and the background digital image or the background video clip. | Logo Image Alignment - Determines the general display screen alignment of the digital image logo when rendered in the scene. Options may include, for example, right, center, left, bottom, and top.<br>Caption Alignment - Determines the general display screen alignment of the caption when rendered in the scene. Options may include, for example, right, center, left, bottom, and top. |
| 2-image collage | Use to create a scene with two digital images presented simultaneously side-by-side. By interacting with the storyboard interface of the digital video builder tool, the lay user may provide the two digital images. | None |
| 3-image collage | Use to create a scene with three digital images presented simultaneously side-by-side. By interacting with the storyboard interface of the digital video builder tool, the lay user may provide the three digital images. | None |
| 4-image collage | Use to create a scene with four digital images presented simultaneously, one in each of four quadrants of the user interface. By interacting with the storyboard interface of the digital video builder tool, the lay user may provide the four digital images. | None |
| Wall collage | User to create a scene with up to N (e.g., 25) number of digital images presented simultaneously. By interacting with the storyboard interface of the digital video builder tool, the lay user may provide the N digital images. | None |

The above Table 1 lists just some examples of the possible storyboard block types. Other storyboard block types are possible that incorporate different types or different numbers of media elements or in different configurations or arrangements or with different scene parameters. The technologies disclosed are not limited to any particular storyboard block type or set of storyboard block types.

Scene Specifications and Storyboard Blocks

Figure 5:
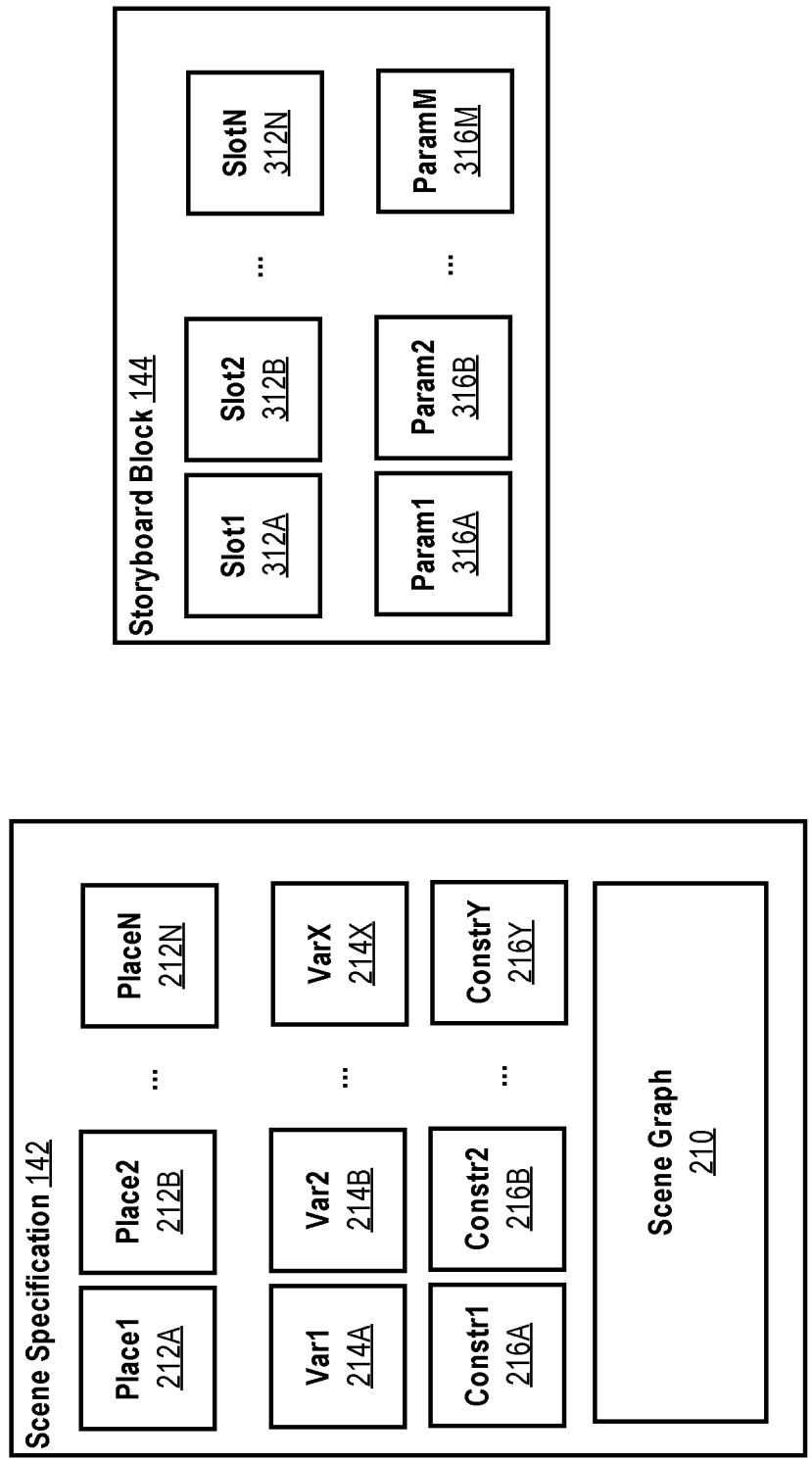
FIG. 5 is a block diagram that shows at a high-level the relationship between a scene specification and a corresponding storyboard block, according to embodiments of the subject innovations.

FIG. 5 is a block diagram that shows at a high-level the relationship between a scene specification 142 and its corresponding storyboard block 144 according to some embodiments of the present invention. A scene specification 142 may be created by an expert or other trained personnel using professional video effects software such as, for example, ADOBE® AFTER EFFECTS®. A scene specification 142 may include one or more media element placeholders (e.g., 212A, 212B . . . 212N), one or more variants (e.g., 214A, 214B . . . 214X), one or more designer-specified constraints (e.g., 216A, 216B . . . 216Y) and a scene graph 210. The corresponding storyboard block 144 may include one or more media element placeholders (e.g., 312A, 312B . . . 312N) and one or more scene parameters (e.g., 316A, 316B . . . 316M). The corresponding storyboard block 144 may omit the scene graph 210 that is included in the scene specification 142.

In operation, the lay user 408 may interact with the storyboard interface to fill the slot(s) 312 of the storyboard block 144 with media elements provided by the lay user 108.

In addition, the lay user 108 may configure the scene parameter(s) 316 of the storyboard block 144. If the user 108 interacts with the storyboard interface to request generation of the digital video preview, the storyboard block 144, with the filled slot(s) 312 and configured parameter(s) 316, may be used by the client-side tool 412 to configure the preview rendering engine 414 to generate the digital video preview with the media elements provided by the lay user 408 and according to the lay user's 408 configuration of the parameters (s) 316. As mentioned, the storyboard block 144 does not include the scene graph 210 as does the corresponding scene specification 142. As a result, the scene of the digital video preview rendering by the preview rendering engine 414 based on the configured storyboard block 144 may not exhibit the animation effects that are exhibited by the scene of the target digital video when rendered by the full rendering engine 422 based on the corresponding scene specification 142.

If the lay user 408 interacts with the storyboard interface to request generation of the target digital video, the storyboard block 144, with the filled slot(s) 312 and configured scene parameter(s) 316, are provided to the presentation server 416. The over-the-network representation of a storyboard block 144, including the configured scene parameter(s) 316, may be JavaScript Object Notation (JSON) or eXtensible Markup Language (XML) or other data serialization format suitable for the requirements of the particular implementation at hand. Media elements provided by the lay user 408 to fill slots 312 may be referenced (e.g., by a URL to the media element's network storage location) in the over-the-network representation instead of being included inline in the over-the-network representation.

When the presentation server 416 receives the storyboard block 124, it passes it onto the server-side builder tool 418. Each slot 312 of the storyboard block 144 may correspond to a placeholder 212 of the corresponding scene specification 142. Similarly, the parameter(s) 316 of the storyboard block 144 that are available for configuration by the lay user 408 may be based on the designer-specified constraints 316 of the corresponding scene specification 142.

Before invoking the full rendering engine 422 to render the target digital video based on the corresponding scene specification 142, the server-side builder tool 418 replaces each placeholder 212 of the corresponding scene specification 412 with the media element that fills the corresponding slot 312 of the corresponding storyboard block 144. The server-side builder tool 418 may also select a variant 214 to render as part of the scene based on the parameters 316 of the storyboard block 144. In this way, the lay user 108 can indirectly configure the scene specification 142 used to render a scene of the target digital video with visually appealing professional-quality animation effects according to the scene graph 210 by directly configuring the corresponding storyboard block 144 through the storyboard interface. After configuring the scene specification 142 based on the storyboard block 144 configuration, the server-side builder tool 418 invokes the full rendering engine 422 to render the target digital video based on the configured scene specification 142.

Storyboarding User Process

Figure 6:
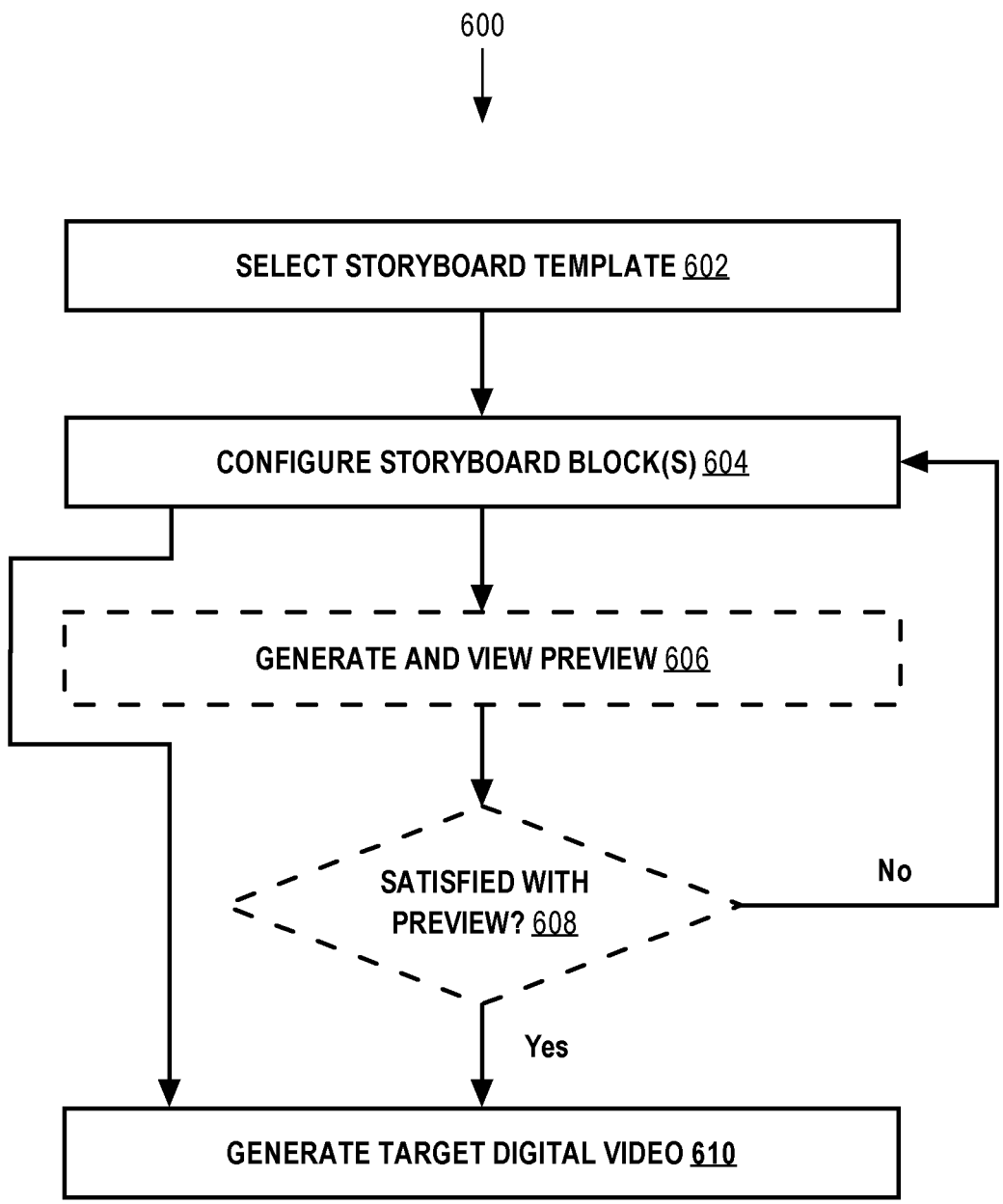
FIG. 6 is a flowchart of the general steps performed by a lay user when using the digital video builder tool with the storyboard interface to storyboard a target digital video to be created, according to an embodiment of the subject innovations.

FIG. 6 is a flowchart of the general steps performed by a lay user when using the digital video builder tool with the storyboard interface to storyboard a target digital video to be created, according to some embodiments of the present invention. The tool may be implemented on one or more computing devices. Such a computing device may incorporate the computer system 1600 of FIG. 16 and the software system 1700 of FIG. 1700, for example.

In some embodiments, the tool is implemented on a plurality of computing devices in a client-server arrangement. In particular, a portion of the tool is implemented on the lay user's computing device and a remaining portion of the tool is implemented on one or more server computing devices connected to the lay user's computing device via a data network such as, for example, the Internet.

In some implementations of the client-server arrangement, the portion of the tool implemented on the lay user's computing device is downloaded from a server computing device over the data network. For example, the portion of the tool implemented on the lay user's computing device may be implemented by instructions for processing by a conventional web browser application installed on the lay user's computing device such as, for example, a combination of one or more of HyperText Markup Language (HTML), Cascading Style Sheet (CSS), and/or JAVASCRIPT instructions. Thus, according to some embodiments, simply by using a computing device having a conventional web browser and an Internet connection, the lay user can create a custom professional-quality digital video.

In some implementations of the client-server arrangement, the storyboard interface and the preview rendering engine are implemented on the lay user's computing device and the design animation modules and the full rendering engine are implemented on the one or more server computing devices. Thus, in these implementations, the lay user's computing device does not need to provide computing resources (e.g., CPU and storage) for storing the scene specifications or for executing the full rendering engine, thereby preserving these computing resource for executing other tasks.

While in some implementations the digital video builder tool is implemented on a plurality of computing devices in client-server arrangement, the digital video builder tool is implemented on a single computing device in a standalone arrangement. For example, all of the storyboard interface, the preview rendering engine, the scene specifications, and the full rendering engine may be implemented on the lay user's computing device, obviating the need for the lay user's computing device to have data network connectivity when using the tool to create a digital video.

At step 602, through interaction with the user interface of the digital video builder tool, the lay user selects a predefined storyboard template of a plurality of available predefined storyboard templates to use as a starting point for storyboarding the target digital video to be created. For example, the lay user may desire to create a promotional digital video for a small business the lay user owns or operates. The predefined storyboard template may be one that is preconfigured in such a way that it is well-suited for creating such a digital video. For example, the number of storyboard blocks in the template, the types of storyboard blocks in the template, and the order of these storyboard blocks in the template may be such that they provide a storyboard for the target digital video that is close to what the lay user desires.

At step 604, the lay user interacts with the storyboard interface of the digital video builder tool to configure selected storyboard blocks of the storyboard template the lay user selected in step 602. Such configuration may include replacing stock media elements of the storyboard blocks with media elements supplied by the lay user, changing default values for scene parameters of the storyboard blocks, adding new storyboard blocks to the storyboard, removing storyboard blocks from the storyboard, and re-ordering the storyboard blocks in the storyboard.

At optional step 606, through interaction with the storyboard interface, the lay user may request the tool to generate a digital video preview of the target digital video to be created. The tool may generate the digital video preview based on the current configuration of the storyboard blocks of the current storyboard. Once generated, the digital video preview is presented in the storyboard interface so that the user can generally see how the target digital video would look if generated based on the current configuration of the storyboard blocks.

To facilitate efficient rendering of the digital video preview at the lay user's computing device, the digital video preview may omit some of the animation effects that will be included in the target digital video.

Even though certain animation effects may be omitted from the digital video preview the lay user may still acquire a useful idea of what the target digital video would look like when the digital video preview is played. For example, from a playback of the digital video preview, the lay user may discern aspects of the target digital video such as total running length, the number of scenes, the order of the scenes, the running time of each scene, and the media elements included in each scene.

In some embodiments, the tool generates the digital video preview by using a WebGL-based rendering engine of a supporting web browser and from the current configuration of the storyboard blocks including the currently configured media elements and scene parameter configurations of the storyboard blocks. WebGL is a cross-platform, royalty-free web standard for a low-level 3D graphics API based on OpenGL ES 2.0, exposed through the HTML5 Canvas element as Document Object Model interfaces. For further description of WebGL, see e.g., "WebGL Specification," (Version 1.0.3, Oct. 27, 2014), from the Khronos Group, the disclosure of which is hereby incorporated by reference. A copy of his specification is available via the Internet (e.g., currently at /registry/webgl/specs/1.0/ in the in the www.khronos.org domain).

If, after viewing a playback of the digital video preview, the lay user is satisfied with how the digital video preview looks, then at step 608 the user may proceed to step 610. On the other hand, if the user is not satisfied with how the digital video preview looks, then at step 608 the user may return to step 604 to further configure the storyboard blocks.

At step 610, through interaction with the storyboard interface, the lay user may request the tool to generate the target digital video to be created. The tool may generate the digital video preview based on the current configuration of the storyboard blocks of the current storyboard. Once generated, the tool may allow the lay user may store the generated target digital video on the lay user's computing device. For example, the tool may allow the lay user to download the target digital video from an online service to the lay user's computing device after the target digital video has been generated by the online service. The tool may provide other actions that the lay user can perform with respect to the generated target digital video. For example, the tool may allow the lay user to share the generated target digital video with others via e-mail or a social networking web site or other web site.

The generated target digital video may incorporate sophisticated animation effects. However, by interacting with the user interface of the digital video builder tool, the lay user can create a custom professional-quality digital video without worrying how to configure a rendering engine to generate such animation effects. Thus, the digital video builder tool with storyboard interface simplifies the task for the user of creating a custom professional-quality digital video with sophisticated animation effects.

Selecting a Storyboard Template

Figure 7:
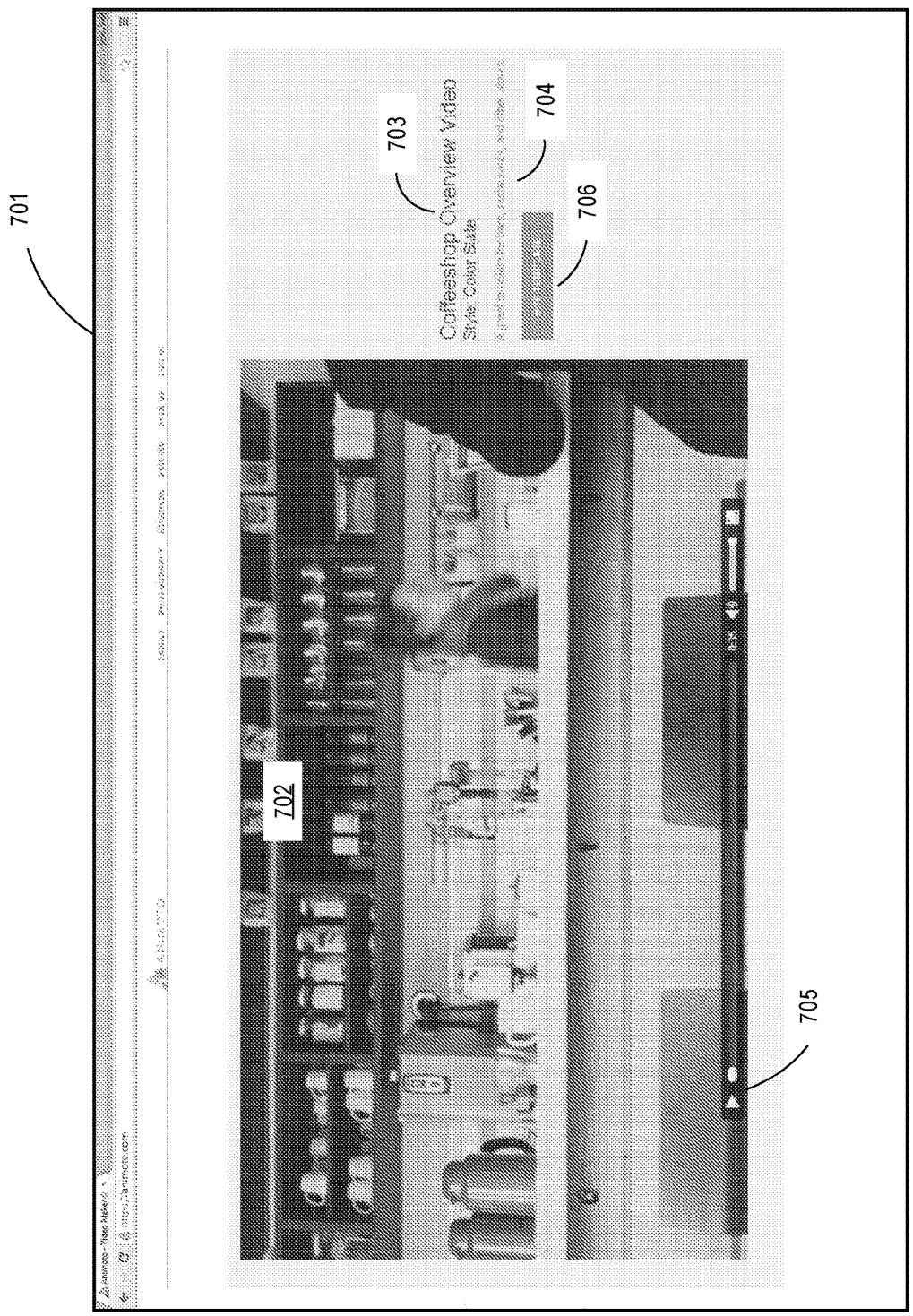
FIG. 7, FIG. 8, FIG. 9, FIG. 10, FIG. 11, FIG. 12, FIG. 13, and FIG. 14 illustrate the storyboard interface of the digital video builder tool according to various embodiments of the subject innovations.

FIG. 7 shows an embodiment of a user interface 701 of the digital video builder tool for selecting a predefined storyboard template. The user interface 701 includes a static visual representation of the storyboard template in the form of a digital image 702, a title 703 of the storyboard template, a short description 704 of the storyboard template, preview video playback interactive controls 705, and a "use template" button 706.

The static visual representation of the storyboard template may be a stock media element 702 associated with one or more storyboard blocks of the template that, along with the title 703 and short description 704 of the storyboard template, conveys to the user the general intended applicability of the template for use in creating a target digital video. For example, elements 702, 703, and 704 of the user interface 701 convey to the end user that the storyboard template is well-suited for creating a digital video that promotes or provides an overview of a coffee shop, a bar, a restaurant, or other retail establishment.

A storyboard template for creating a digital video promoting a coffee shop or other retail establishment is merely one example of the type of storyboard template that may be available for selection in the user interface of the digital video builder tool. Additional or alternative storyboard templates may be available for selection in the user interface for creating other types of digital videos such as, for example, a training video, an instruction and safety video, a promotional or branding video, a new product or service launch video, a technology or product demonstration video, or other type of digital video. The subject innovations are not limited to creating a particular type of digital video.

Playback interactive controls 705 may be activated by the lay user to begin playback of a digital video preview of the storyboard template. The digital video preview may be created by the preview rendering engine by rendering the storyboard blocks of the storyboard template with the associated stock media elements and default scene parameters. The user may activate the playback interactive controls 705 to play the digital video preview so as to acquire a better idea of what the final digital video might look like before selecting the "use template" button 706.

Storyboard Interface

According to some embodiments, the lay user is presented with a user interface that represents a storyboard. Through interaction with the user interface, the lay user configures selected storyboard blocks of a selected storyboard template. Such configuration may include replacing stock media elements of the storyboard blocks with media elements supplied by the lay user. For example, the lay user may replace a stock background image of a storyboard block with a one the lay user supplies. Such configuration may also include changing the default storyboard block configuration to meet the lay user's requirements for the target digital video to be created. For example, the default position of a text media element of a storyboard block may be a position that is aligned vertically in the center of a background image of the storyboard block and the lay user may change the position of the text media element to a position that is aligned vertically on the bottom of the background image. Once the lay user has configured the storyboard blocks to his or her liking, the lay user may then create a digital video preview of the current storyboard and/or create the target digital video according to the current storyboard configuration.

Figure 8:
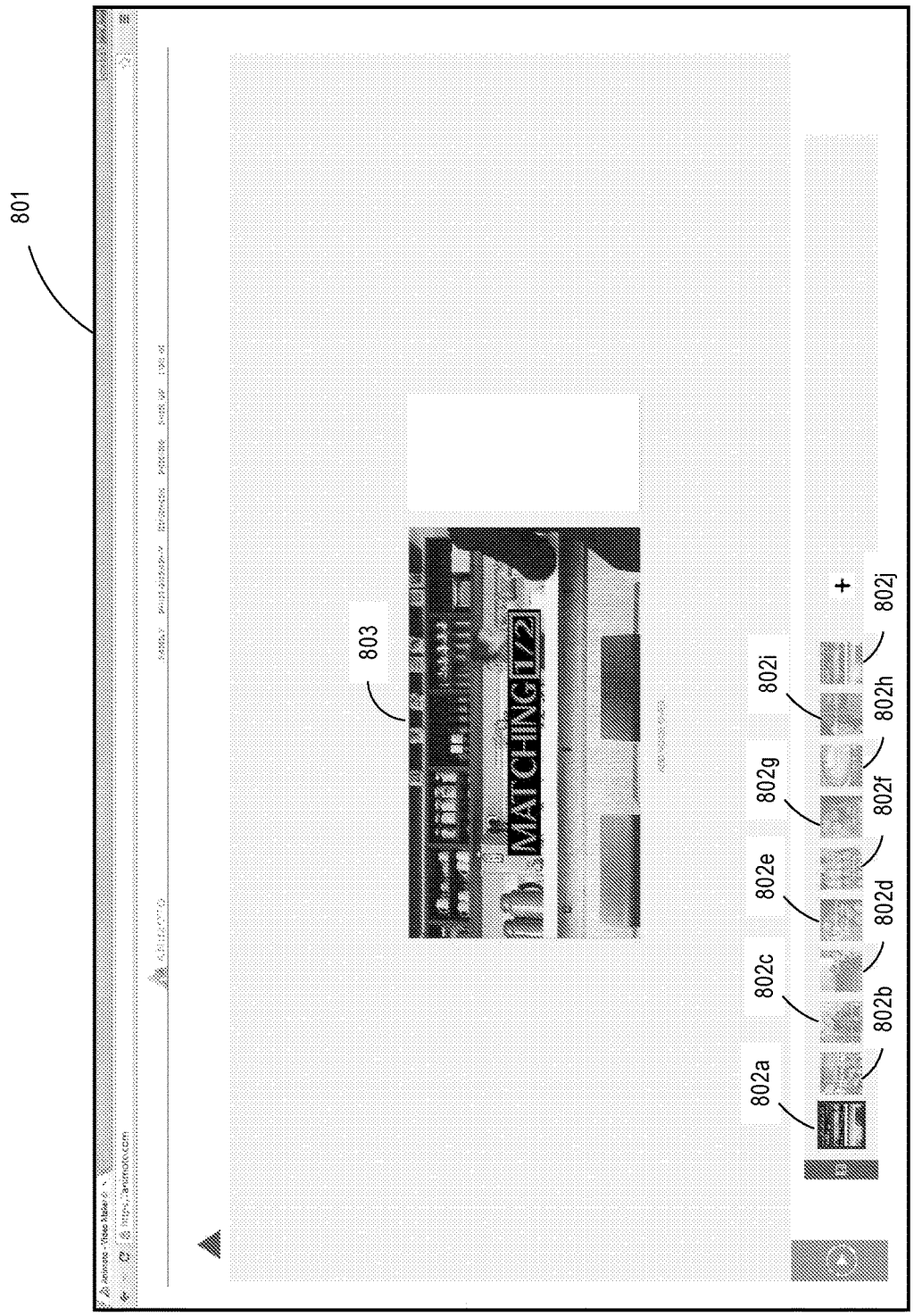

FIG. 8 is an example of a storyboard interface 801. The storyboard interface 801 includes generated visual representations 802a-802j (generally "visual representation 802") for each storyboard block of the current storyboard. In this example, the current storyboard includes ten storyboard blocks. However, the current storyboard could just as easily include as few as a single storyboard block or more than ten storyboard blocks.

Each storyboard block represents a scene of the target digital video to be created. A scene represented by a storyboard block may be a portion of the target digital video. The scene may be rendered as part of the target digital video according to the current configuration of the corresponding storyboard block by a digital video rendering engine such as, for example, the full rendering engine.

According to some embodiments, the full rendering engine comprises a proprietary or open-source or off-the-shelf digital video rendering software for rendering the scene according to the current configuration of the corresponding storyboard block with animation effects. The predetermined animation effects may incorporate computer animation techniques such as, for example, layering, scaling, blurring, transitions, or other animation effects techniques.

Each storyboard block also represents a scene of a preview digital video. Thus, a scene represented by a storyboard block may also be a portion of the digital video preview. The scene may be rendered as part of the digital video preview according to the current configuration of the corresponding storyboard block by a digital video rendering engine such as, for example, the preview rendering engine.

According to some embodiments, the preview rendering engine comprises an application programming interface (API) for rendering two-dimensional and three-dimensional computer graphics in a compatible web browser. In some implementations, the application programming interface of the preview rendering engine is WebGL-based.

According to one embodiment, the preview rendering engine requires fewer computing resources (e.g., CPU cycles) to render the digital video preview according to the current configuration of the storyboard blocks than the full rendering engine requires to render the full digital video according to the current configuration. To achieve this, the preview rendering engine may not render some of the animation effects that are rendered by the full rendering engine when rendering the target digital video. By doing this, it is practical to locate the preview rendering engine at the user's computing device and render the digital video preview at the user's computing device. For example, the preview rendering engine may be a WebGL-based rendering engine for rendering the digital video preview in a web browser executing on the user's computing device. By rendering the digital video preview at the user's computing device it is not necessary to download the digital video preview to the user's computing device from a server system that renders the digital video preview, thereby consuming less network resources and potentially decreasing the time between when the user requests the digital video builder tool to generate the digital video preview and when the user can view the digital video preview.

Each visual depiction of a storyboard block in the storyboard interface may include a static visual representation of the scene represented by the storyboard block. Such static visual representation may reflect the currently configured media element(s) and current scene parameter configuration. For example, user interface 801 includes static visual representation 803 of the storyboard block of the currently selected visual representation 802a.

The user can configure a particular storyboard block by selecting the corresponding visual representation of the particular storyboard block in the storyboard interface. For example, visual representation 802a is currently selected which is indicted in storyboard interface 801 with highlighting. In response to selection by the lay user of visual representation 802a through the storyboard interface 801, the static visual representation 803 of the scene represented by the selected storyboard block is displayed in the storyboard interface 801. Once selected, the storyboard block may be configured according to its type.

By interacting with the storyboard interface, the lay user can create a storyboard for a target digital video to be created that incorporates different storyboard block types. For example, in the example of FIG. 8, the sequence of storyboard blocks corresponding to visual depictions 802a-802j, respectively, are the following storyboard block types from Table 1 above, respectively: Logo+Media (802a), Media+One Line (802b), Media Only (802c), Media Only (802d), Media+Multiple Lines (802e), Media+Caption (802f), Media+Caption (802g), Media+Caption (802h), Media+One Line (802i), and Logo+Media (802j).

The display order of the visual depictions of the storyboard blocks in the storyboard interface may reflect the order in which corresponding scenes will be presented in the digital video preview and the target digital video when rendered. For example, in the example of FIG. 8, the scene represented by the storyboard block of visual depiction 802a will be presented before the scene represented by the storyboard block of visual depiction 802b and that scene will be presented before the scene represented by the storyboard block of visual depiction 802c and so on. Thus, by viewing the display order of the visual representations 802 of the storyboard blocks in the storyboard interface the lay user can also see the presentation order of the scenes represented by the corresponding storyboard blocks.

While in some embodiments the presentation order of the scenes represented by the current storyboard blocks correspond to a left-to-right display order of the visual depictions of the storyboard blocks in the storyboard interface, the presentation order of the scenes corresponds to different display orders of the visual depictions in other embodiments. For example, the presentation order of the scenes may correspond to a right-to-left, top-to-bottom, or bottom-to-top display order of the visual depictions.

Replacing a Media Element of a Selected Storyboard Block

Once the lay user has selected a visual depiction of a storyboard block through the storyboard interface, the user may then configure the selected storyboard block through the storyboard interface. For example, the lay user may replace a stock media element of the selected storyboard block with one the lay user provides.

Figure 9:
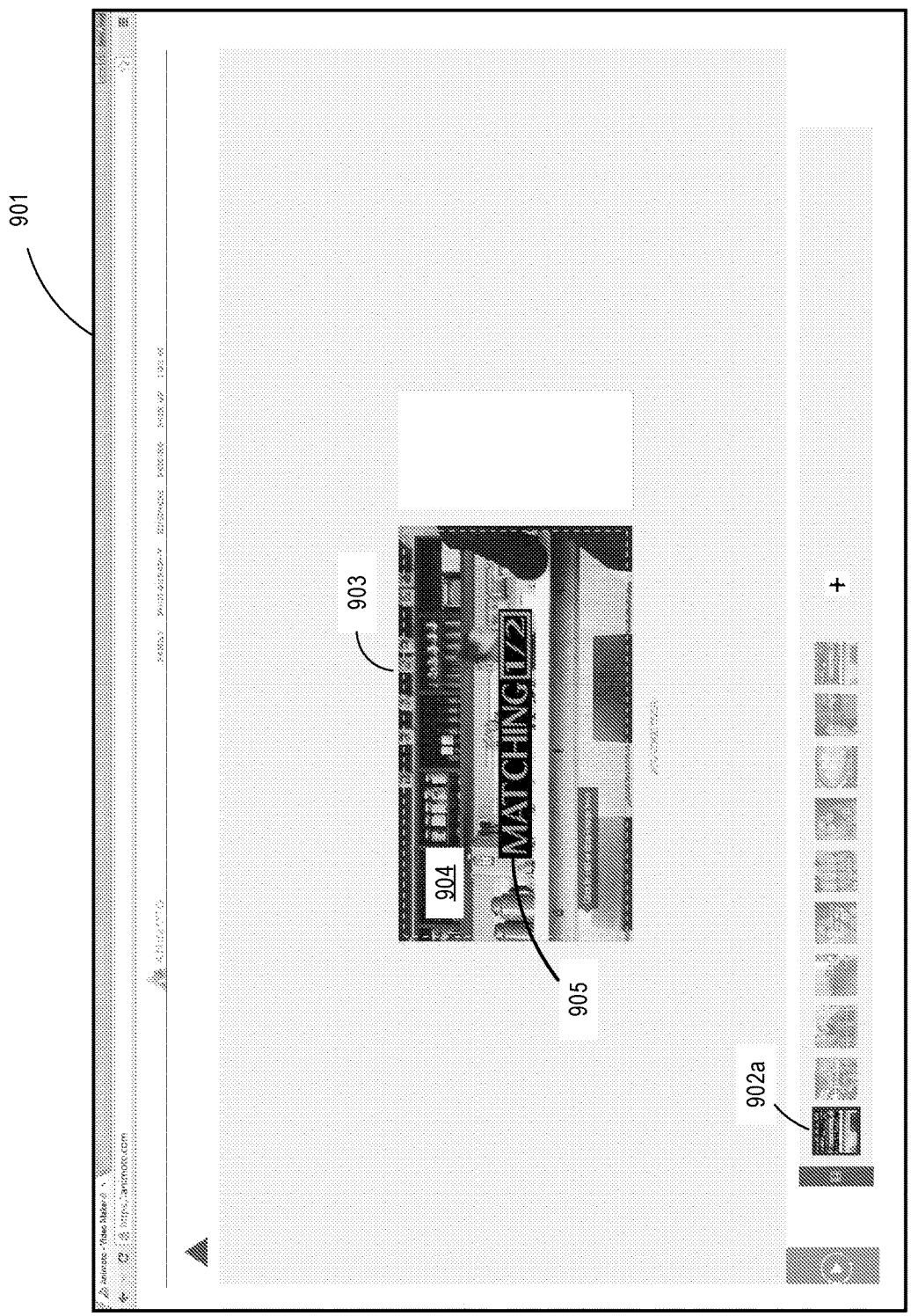

FIG. 9 shows a storyboard interface 901 with a static visual representation 903 of the currently selected storyboard block corresponding to visual depiction 902a. Visual depiction 902a is highlighted to indicate that it is currently selected. In this example, the currently selected storyboard block is the Logo+Media type of storyboard block as described in Table 1 above. Accordingly, the currently selected storyboard block includes a background image 904 with a logo image 905 overlaying the background image 904. As currently configured, the currently selected storyboard block does not include any caption text.

By interacting with the storyboard interface, the lay user can replace a current media element of a currently selected storyboard block with a new media element. For example, the user may replace the background image 004 of the currently selected storyboard block by dragging and dropping a new digital image file into an area of the storyboard interface 901 where the current background image 904 is displayed. Alternatively, the lay user may select the current background image 904 with user input (e.g., with keyboard, pointing device, or touch gesture input) and then select a new digital image file containing a new digital image to replace the current background image 904 (e.g., by using file system browsing user interface interactive controls).

Similarly, the lay user may replace the logo image 905 of the currently selected storyboard block by dragging and dropping a new digital image file into an area of the storyboard interface 901 where the current logo image 905 is displayed. Alternatively, the lay user may select the current logo image 905 with user input (e.g., with keyboard, pointing device, or touch gesture input) and then select a new digital image file containing a new digital image to replace the current logo image 905 (e.g., by using file system browsing user interface interactive controls).

According to some embodiments, when a digital image media element of a storyboard block is replaced with a new digital image media element. The new digital image media element is resized accordingly to fit the dimensions of the replaced digital image media element.

According to some embodiments, after a media element of a storyboard block is replaced with a new media element, the static visual representation of the storyboard is updated to show the new media element. For example, after replacing the current logo image 905 with another new digital image, the static visual representation 903 may be updated to show the new digital image in the place in the user interface 901 where the replaced logo image 905 was displayed.

Configuring Scene Parameters of a Storyboard Block

A scene parameter is an aspect of a storyboard block that is configurable by the lay user through interactive controls provided in the storyboard interface. A storyboard block may provide a small or limited number of scene parameters to reduce the cognitive burden on the lay user. The lay user's cognitive burden is reduced because the storyboard interface requires the lay user to understand fewer options for configuring the storyboard blocks. This is especially so when compared to the user interfaces of many professional video editing tools that provide hundreds of options or more that are configurable through the user interface.

Figure 10:
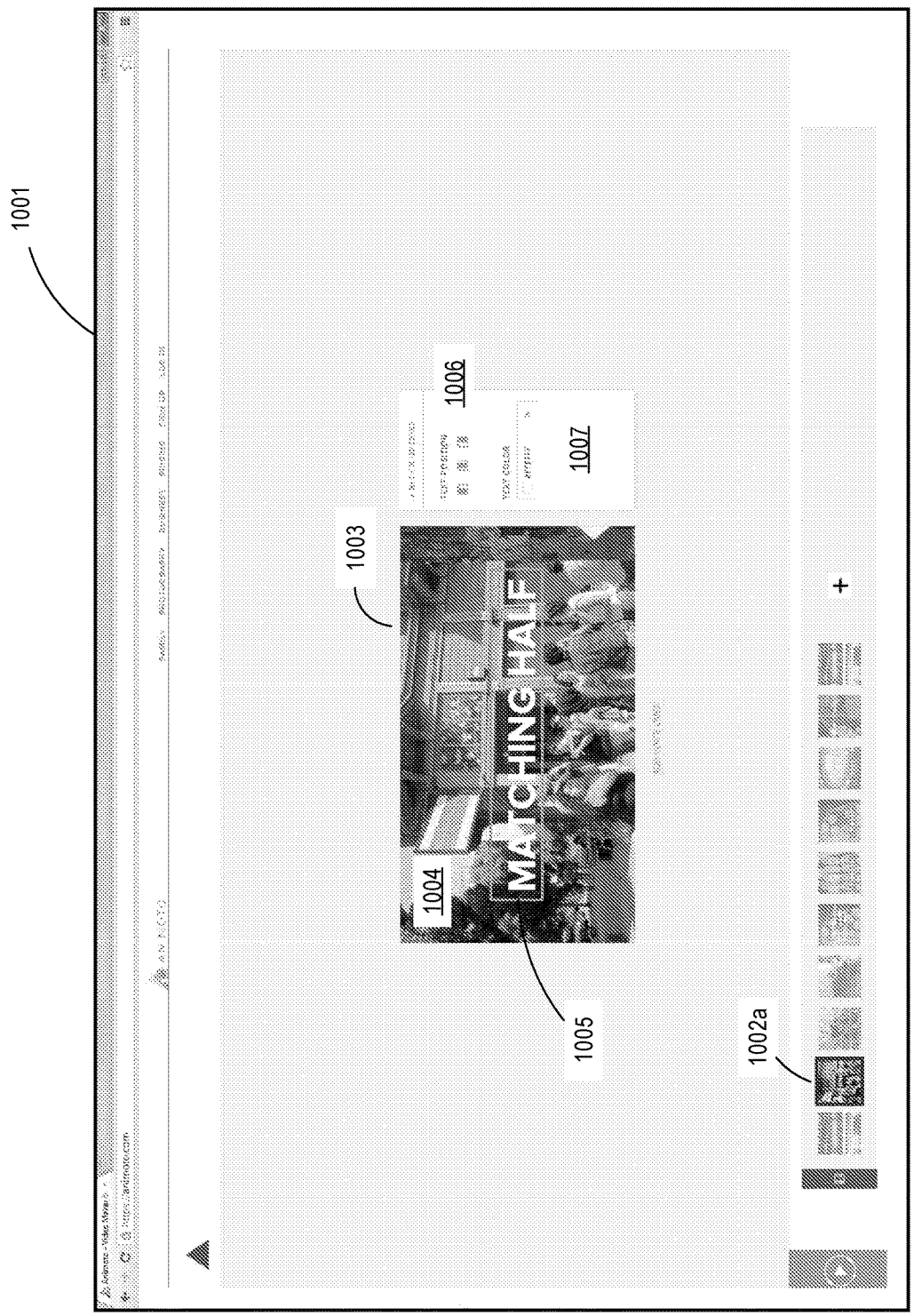

An example of configuring a scene parameter of a storyboard block will now be described with respect to FIG. 10, which shows a storyboard 1001 with a static visual representation 1003 of a currently selected storyboard block corresponding to visual representation 1002a. In this example the currently selected storyboard block is a Media+ One Line type of storyboard block. Accordingly, the storyboard block includes a background media element which, in this example, is a digital image 1004 and also includes a line of text 1005.

Through interaction with the storyboard interface 1001, the lay user has currently selected (as shown with highlighting) the line of text 1005 to configure any scene parameters that are available with respect to the line of text 1005. In this example, the scene parameters available for the line of text 1005 include a text alignment scene parameter 506 and a text color scene parameter 1007. Through interaction with the storyboard interface 1001, the lay user can select an option for the text alignment scene parameter 1006. In this example, by selecting one of the text alignment icons, the user can select a left, center, or right text alignment for the line of text 1005. Through interaction with the storyboard interface 1001, the lay user can also select a color value for the text color scene parameter 1007. In this example, the color value is expressed in the form a Red Green Blue (RGB) hexadecimal color value.

Text alignment and text color are just some examples of the possible storyboard block scene parameters that may be configured through the storyboard interface. For example, storyboard interface 1001 may also present interactive controls for select a font size or font type for the line of text 1005. The disclosed technologies are not limited to any particular set of scene parameters.

A storyboard block scene parameter may have a default value. For example, the default value for text alignment scene parameter 1006 may be "center". By interacting with the storyboard interface, the lay user can override the default value. For example, by interacting with storyboard interface 1001, the lay user can change the current configuration of the text alignment scene parameter 1006 from its default value "center" to "left" or "right".

When a digital video preview or the target digital video is created, the current configuration of the storyboard block scene parameters are applied by the digital video builder tool during creation of the digital video preview and the target digital video. For example, the digital video tool may command the preview rendering engine to render a digital video preview based on the current configuration of the text alignment scene parameter 1006 and the text color scene parameter 1007 such that when the digital video preview is played the line of text 1005 appears in the digital video preview according to the current configuration. Similarly, the digital video tool may command the full rendering engine to render the target digital video based on the current configuration of the text alignment scene parameter 1006 and the text color scene parameter 1007 such that when the target digital video is played the line of text 1005 appears in the target digital video according to the current configuration.

According to some embodiments, the scene parameters selected by the lay user controls which variant of the scene specification is used by the full rendering engine to render the scene. In particular, the designer, when designing the scene specification, may specify, as part of the scene specification, valid scene parameters for specific variants. For example, the scene specification corresponding to the storyboard block selected in FIG. 10 may specify three variants. In addition, the designer may specify that each of the three variants is valid only for a respective one of the three different possible alignments for the text box 1005 that the lay user can select using interactive controls 1006. Thus, depending on which alignment the lay user selects for text box 1006 (i.e., left, center, or right), a different variant of the corresponding scene specification is used by the full rendering engine to render the scene as part of the target digital video.

While in some embodiments the scene parameters selected by the lay user result in selection of a single variant of a scene specification to be used by the full rendering engine to render the scene, the scene parameters result in selection of multiple variants in other embodiments. In these embodiments, multiple inter-operable variants of a scene specification may be grouped together by a common label or identifier and associated with a set of one or more scene parameters. When the lay user selects the one or more scene parameters for the corresponding storyboard block, the group of inter-operable variants are selected for use by the full rendering engine to render the scene. Multiple variants may also be arranged in a hierarchical or nested manner within a scene specification such that an descendant or nested variant may inherit values or properties from an ancestor or containing variant. Scene parameters selected by the lay user may result in selection of a descendant or nested variant including any values or properties inherited from ancestor or containing variants for use by the full rendering engine in rendering the scene.

Adding a New Storyboard Block

Figure 11:
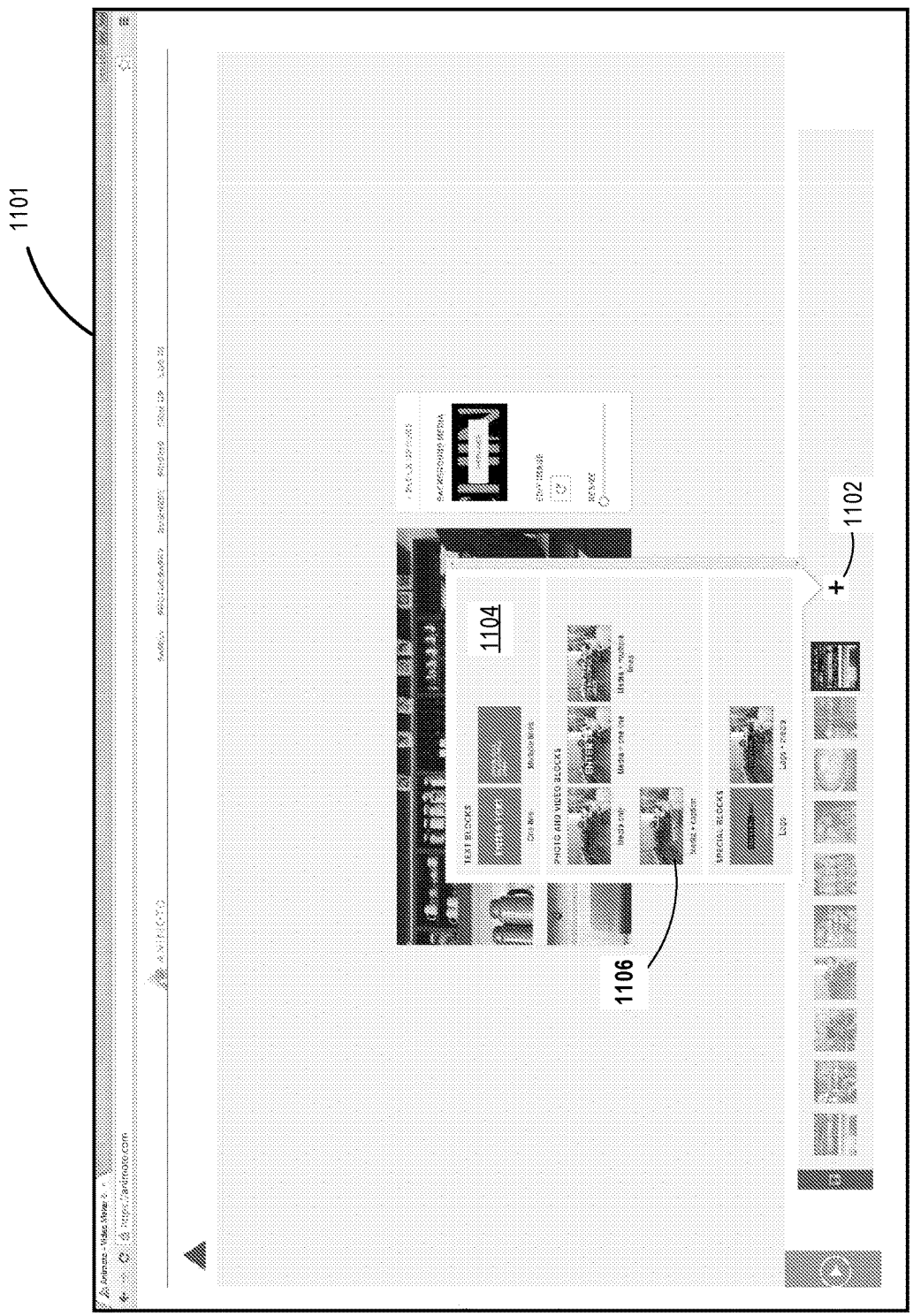

By interacting with the storyboard interface, the lay user can add a new storyboard block to the current storyboard. For example, the storyboard interface 1101 of FIG. 11 provides user interface interactive controls 1102 for adding a new storyboard block. In response to the lay user activating interactive controls 1102, dialog 1104 is displayed. By interacting with dialog 1104, the lay user can select the storyboard block type for the new storyboard block.

Figure 12:
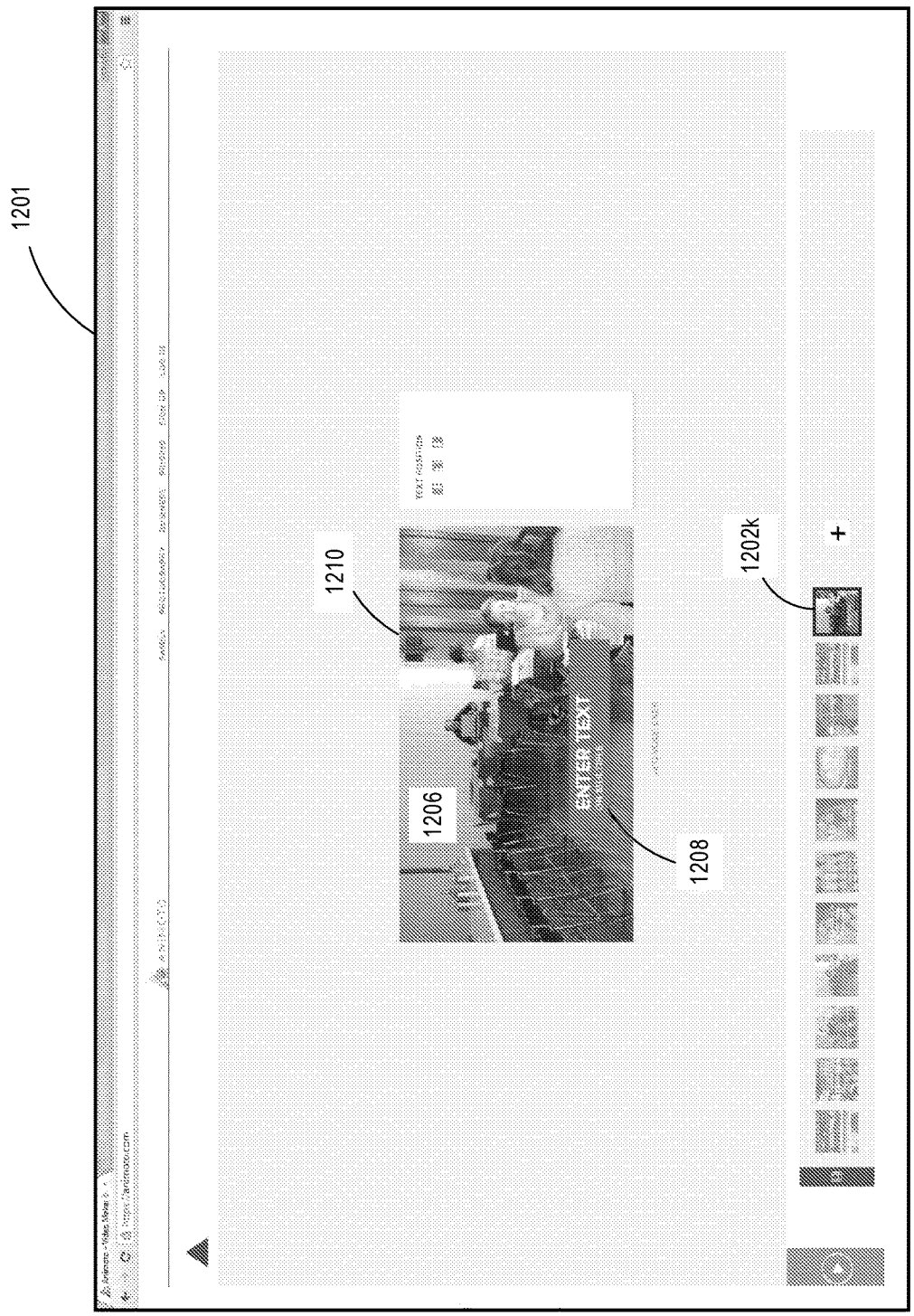

FIG. 12 shows a storyboard interface 1201 after the lay user selects, with user input directed to the user interface 1201, the Media+Caption storyboard block type 1206 for the new storyboard block. As a result of the selection, visual representation 1202k of the new storyboard block is displayed in the user interface 1201. In this example, by default, the digital video builder tool appends the new storyboard block to the end of the current sequence of storyboard blocks such that the new storyboard block becomes the last storyboard block in the sequence. However, the tool could just as easily by default prepend the new storyboard block to the current sequence or insert the new storyboard block at some other point in the sequence other than the beginning or the end. Alternatively, the digital video builder tool could place the new storyboard block in the current sequence according to user input provided by the lay user.

Also in response to the user's selection of a storyboard block type 1206 for the new storyboard block, a static visual representation 1210 of the new storyboard block is displayed by the tool. In this example, the new storyboard block includes a stock background digital image 1206 depicting a scene in a coffee shop and stock caption text 1208. The user may direct user input to the user interface 1201 to replace the stock image 1206 and/or the stock caption text 1208.

Ordering Storyboard Blocks

As mentioned above, the displayed order of the visual representations of the current storyboard blocks reflects the order the scenes corresponding to those storyboard blocks will be presented in a digital video preview or a target digital video when generated by the tool based on the current storyboard blocks. By interacting with the storyboard interface, the lay user can change the displayed order of the visual representations of the current storyboard blocks and consequently change the order in which the corresponding scenes are presented in the digital video preview and/or the target digital view.

According to some embodiments, a left-to-right ordering of the visual representations of the current storyboard blocks are used to convey the ordering of the corresponding scenes. For example, in FIG. 12, the scene corresponding to new storyboard block represented by visual representation 1202k would be the last (11$^{th}$) scene presented among all scenes represented. While in some embodiments a left-to-right ordering is used, a top-to-bottom, a bottom-to-top, a right-to-left, or other visual ordering is used.

Figure 13:
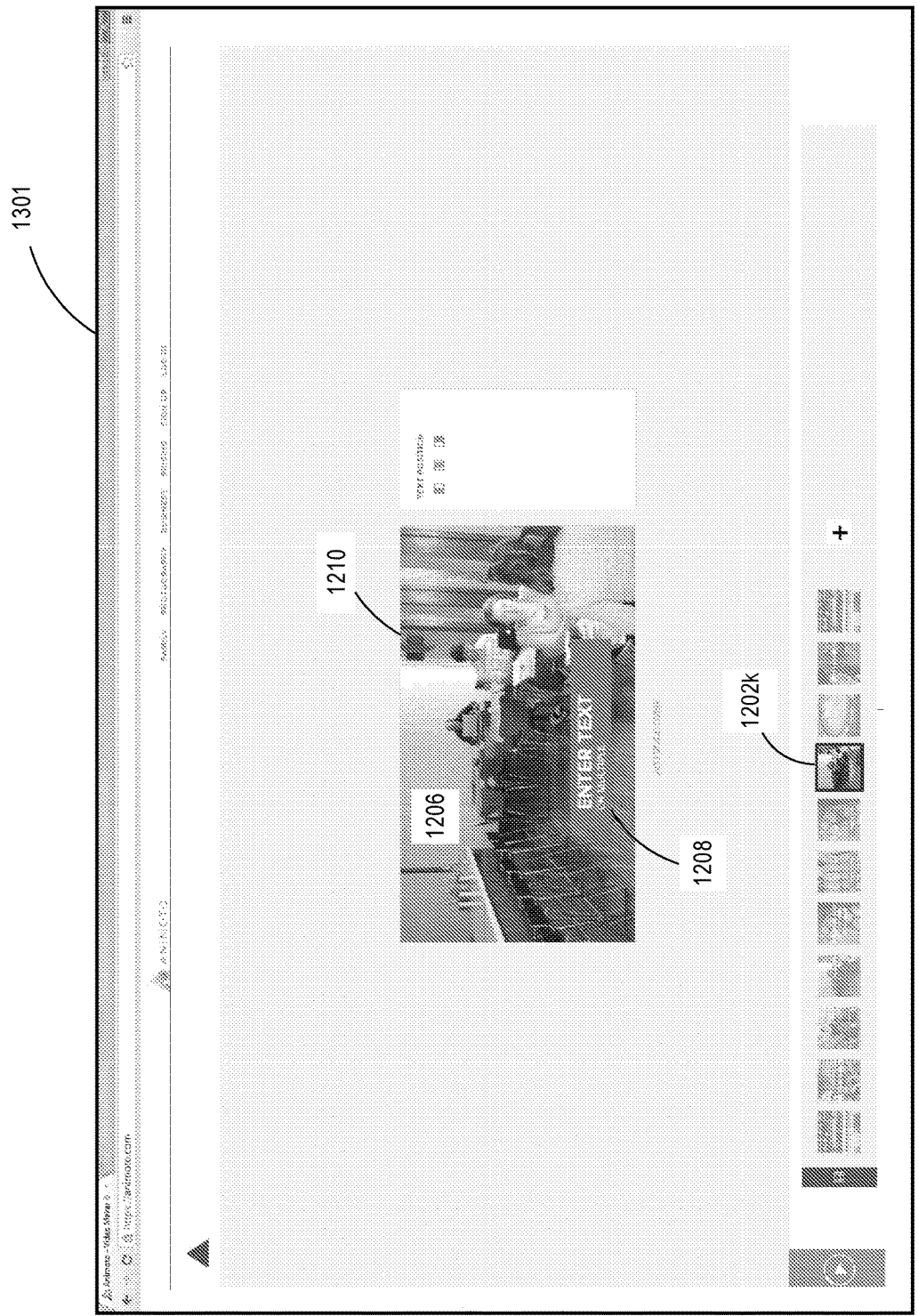

FIG. 13 shows the storyboard interface 1301 after the user has interacted with the user interface 1201 of FIG. 12 to move visual representation 1202k from the end (11$^{th}$ position) of the left-to-right ordering of the visual representations to the 8$^{th}$ position in the ordering. As result, if a digital video preview or the target digital video were generated by the tool based on the current order of the visual representations of the current storyboard blocks as presented in user interface 1301, the scene corresponding to the storyboard block represented by visual representation 1202k would be the 8$^{th}$ scene presented among all scenes represented, instead of being the last (11$^{th}$) scene presented.

According to some embodiments, the lay user can reorder the visual representations of the current storyboard blocks by dragging and dropping a visual representation from a current position in the visual representations to a new position the visual representation. For example, the user may achieve the ordering shown in user interface 1301 by dragging and dropping the visual representation 1202k from the 11$^{th}$ position as shown in user interface 1201 of FIG. 12 to the 8$^{th}$ position as shown in user interface 1301.

Deleting a Storyboard Block

As well as adding a new storyboard block to the current storyboard blocks and ordering the current storyboard blocks, the lay user, by interacting with the storyboard interface, can also delete a current storyboard block. In some embodiments, the lay user deletes a storyboard block by selecting the visual representation of the storyboard block in the storyboard interface and issuing a delete command to the digital video builder tool with further user input. For example, the lay user may issue the delete command by striking the "Delete" key on a computer keyboard or by selecting a "delete" option from a drop-down menu displayed in the storyboard interface. As a result of deleting a storyboard block from the current set of storyboard blocks, a preview digital video or the target digital video, if generated by the tool based on the storyboard blocks after the deletion operation, will not include the scene corresponding to the deleted storyboard block.

Viewing a Preview of the Target Digital Video

Figure 14:
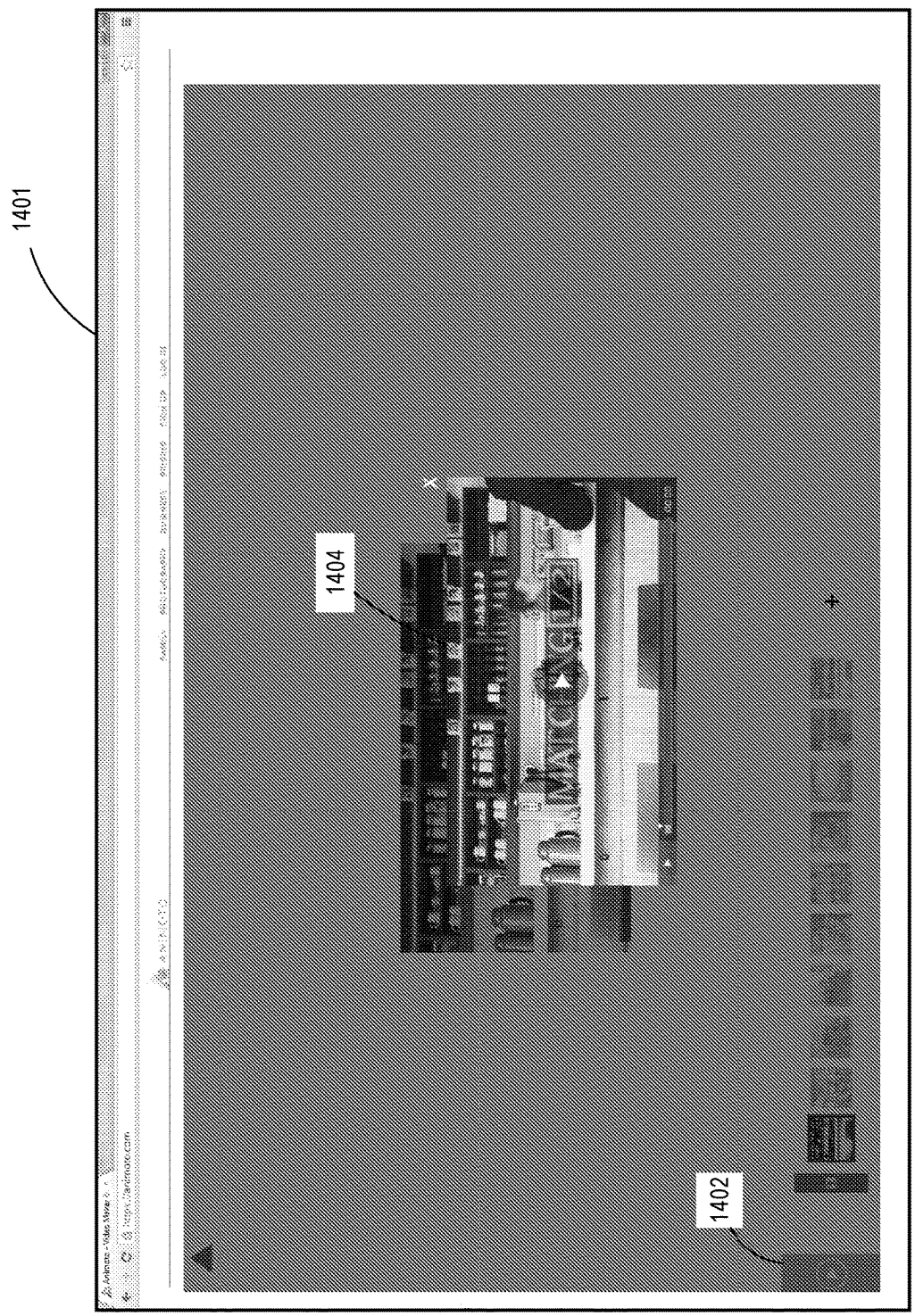

By interacting with the storyboard interface, the lay user can view a preview of the target digital video to be created based on the current configuration of the current set of storyboard blocks. For example, FIG. 14 shows the storyboard interface 1401 after the lay user has activated with user input preview interactive controls 1402. In response to the user's activation of the preview interactive controls 1402, the digital video builder tool generates a digital video preview of the target digital video to be created based on the current configuration of the storyboard blocks. The digital video preview generated may reflect the current media elements and scene parameter configurations of the storyboard blocks. However, the digital video preview may omit some of the animation effects that will be included in the target digital video. Also in response to the user's activation of the preview interactive controls 1402, once the digital video builder tool has generated the digital video preview, a playback 1404 of the generated digital video preview is initiated in the user interface 1401 allowing the user to view the digital video preview.

Automatic Creation of a Storyboard Template

A lay user may like the appearance of a certain digital video. For example, an owner of a coffee shop might view a digital video that promotes a hair salon and decide to make a similar promotional video for her coffee shop. Unfortunately, the hair salon digital video may not have been created using the digital video builder tool. For example, the hair salon digital video may have been created using professional video effects software or by a professional video production firm. In this case, there may be no storyboard template available on which the coffee shop owner can base the creation of her digital video.

According to some embodiments of the present invention, the digital video builder tool automatically creates a storyboard template complete with preconfigured storyboard blocks from a given digital video. To do this, the digital video builder tool may employ video scene detection techniques. Generally, the digital video builder tool analyzes the digital video and based on the analysis splits the video up into scenes. In this context, each scene is a series of interrelated video frames representing continuous action in time and space. Once each scene is identified, the digital video builder tool captures representative media elements of the scene from the video frames of the scene. For example, the video builder tool may capture a background image media element and a text overlay media element that appears in a corresponding scene. The digital video builder then creates a storyboard block for each identified scene and includes the representative media elements captured from the video frames of the scenes in the respective storyboard blocks. The storyboard blocks may be ordered in a manner that corresponds to the order of the respective identified scenes. The digital video builder tool collects the storyboard blocks in a new storyboard template which is then made available for selection by a user through the user interface of the digital video builder tool. By doing so, even if the digital video builder tool does not provide a storyboard template that is suitable to the user for creating the digital video the lay user desires to create, the digital video builder tool can create a suitable storyboard template based on a digital video provided by the lay user.

According to some embodiments, the digital video builder tool detects scenes in a digital video by detecting "cuts". In this context, a "cut" refers to a position in the digital video where one scene is replaced by another scene with different visual content. Detecting a cut may involve the digital video builder tool detecting a transition from one scene to the next. A transition can be abrupt such as a sudden transition from one scene to the next. For example, one video frame may belong to a first scene and the next video frame may belong to the next scene. A transition can instead be gradual. A gradual transition typically involves combining two scenes using chromatic, spatial or spatial-chromatic effects which gradually replace one scene with another. Gradual transitions can be of various types such as, for example, wipes, dissolves, fades, etc.

According to some embodiments, cut detection by the digital video builder tool involves the digital video builder tool scoring consecutive frames of the digital video based on how visually similar or dissimilar the consecutive frames are, and then evaluating the scores for consecutive frames to identify a frame or frames that represent a cut. Scoring may involve the digital video builder tool employing one or more various different approaches such as, for example, a sum of absolute differences approach, a histogram differences approach, an edge change ration approach, etc. Deciding based on the scores whether a cut exists at a given position in the digital video may involve various employing one of various different approaches such as, for example, a fixed threshold approach, an adaptive threshold approach, a machine learning approach, etc.

Audio Accompaniment

According to some embodiments, the user interface of the digital video builder tool allows the lay user to provide a digital audio file that contains playable audio that is to serve as an audio accompaniment to the target digital video. According to some embodiments, a selected storyboard template is pre-configured with a digital audio file that the user can accept when creating the target digital video or replace with a digital audio file provided by the user. According to some embodiments, the digital video builder tool automatically selects a digital audio file to accompany the target digital video based on various factors such as the length the target digital video. When there is an audio accompaniment to the target digital video, the digital video builder tool may create a single audio/video media file that includes both the target digital video and the audio accompaniment.

According to some embodiments, the digital video builder tool may adjust the length of a scene or the timing of animation effects included in a scene when rendering the target digital video to match an audio accompaniment. For example, by interacting with the user interface of the digital video builder tool, the user may configure a specific storyboard block with an audio voice over. When the scene corresponding to the storyboard block is rendered by the digital video builder tool as part of the target digital video, the length of the scene may be based on the length of the audio voice over. For example, the scene may be at least as long as the length of the audio voice over. As another example, the digital video builder tool may render the target digital video such that the overall length of the target digital video is at least as long as a song or musical accompaniment to the video. Such lengthening may be accomplished by pacing the animation effects applied to media elements, for example. In some embodiments, instead of or in addition to pacing animation effects, if the length of the target digital video is such that it is difficult or impractical to lengthen the playing time of the target digital video to match the play length of a song or musical accompaniment, the song or musical accompaniment is truncated at or near the end of the target digital video. For example, the audio accompaniment may fade out or otherwise become less audible as the end of the target digital video nears during playback.

Lightweight Preview Rendering with Complex Full Rendering

It may be impractical for the client-side builder tool to use the preview rendering engine to render a preview digital video that incorporates sophisticated animation effects because of the relatively limited computing resources of the lay user's computing device. Further, rendering capabilities may differ greatly between different browser platforms making the task of rendering a consistent looking target digital video difficult or impractical. Nonetheless, it is desirable for the client-side builder tool to be able to efficiently render the preview digital video using the preview rendering engine while at the same time providing a good approximation of the target digital video.

To this end, according to some embodiments, a scene specification is compiled into a corresponding storyboard block. The storyboard block may exclude rendering instructions for rendering sophisticated animated effects that are included in the design animation module from which the storyboard block is compiled. For example, the storyboard block may exclude a scene graph that is included in the scene specification.

Nonetheless, there is correspondence between the storyboard block and the scene specification from which it is complied. In particular, the storyboard block may have media element slots that correspond one-to-one to placeholders of the scene specification. Further, the available configurable scene parameters of the storyboard block may be dictated by the designer-specified constraints of the scene specification. By having this correspondence, the storyboard block can be optimized for rendering a scene of the preview digital video by the preview rendering engine at the lay user's computer device and the scene specification can be optimized for rendering a fully animated scene of the target digital video by the full rendering engine. In particular, the storyboard block can omit certain instructions for rendering sophisticated animation effects that would require significant computational resources of the lay user's computing device while the scene specification can include those instructions for rendering by the full rendering engine, which may execute on one or more powerful server computers.

Designer-Controlled Lay User Interaction

According to embodiments of the present invention, scene specifications used by the full rendering engine when rendering the target digital video are configurable through corresponding storyboard blocks. The configurable aspects of a storyboard block may include all of the following, or a subset or a superset thereof:

text slots;
layout parameters, animation parameters, and transition parameters;
media element anchors; and
media element scaling.

Text Slots

A text slot of a storyboard block, and the corresponding text placeholder of the corresponding scene specification, may contain text provided by the lay user. A text slot may be preconfigured with a maximum bounds for the text slot. For example, the designer of the scene specification may preconfigure the text placeholder when designing the scene specification with the maximum bounds. The maximum bounds can be specified as a length and a width of the textbox in terms of number of pixels. When the end-user configures the corresponding text slot of the corresponding storyboard block with text, the text slot is constrained in size according to the maximum bounds. In other words, the text slot is not allowed to be larger in length than the maximum length and not allowed to be larger in width than the maximum width. For example, as the end-user enters text into the text slot through the storyboard interface, the text slot will grow to accommodate the entered text so long as the size of the text slot is less than the maximum bounds. The maximum bounds of the text slot prevents the lay user from entering too much text or too large of text that would result in a less visually appealing target digital video.

According to some embodiments, the designer of the scene specification can set the direction text entered in a text slot grows when the lay user enters text into the text slot through the storyboard interface. Possible directions include left-to-right, right-to-left, top-to-bottom, or bottom-to-top. If the maximum length of the text slot or the maximum width of the text slot is reached as the lay user enters text, then subsequently entered text may wrap according to the configured text direction until the other of the maximum length or maximum width is reached.

By configuring a text placeholder of a scene specification with a specific text direction, the designer of the scene specification can anchor the text at a particular position on the screen relative to other text and media elements of the scene specification and control how text provided by the lay user is positioned on the screen relative to those other media elements. For example, the designer could anchor the top-left corner of the text placeholder close to the left-edge of the screen and configure the text placeholder with a left-to-right text direction to avoid text entered into the text slot by the lay user from obfuscating a portion of a digital image media element on which the entered text is overlaid (e.g., the portion to the left of the text placeholder).

Scene Parameters

A scene parameter is a configurable aspect of a storyboard block configurable by the lay user through the storyboard interface. Scene parameters coupled with variants allow a designer to design a single scene specification that is capable of being rendered into different scenes depending on how the scene parameters are configured by the lay user.

Within a scene specification, different available variants of the scene may be represented by different sub-graphs of the scene graph of the scene specification. Each of the different sub-graphs may be labeled in the scene graph with a name, tag, or other identifier of the corresponding variant. A variant of a scene specification may be selected based on how the scene parameters of the corresponding storyboard block are configured by the lay user. For example, a particular scene specification may have two variants and one of two the variants may be selected for rendering by the full rendering engine depending on the anchor position of a media element as configured by the lay user through the storyboard interface. The sub-graph in the scene graph corresponding to the selected variant can be identified by the server-side builder tool when rendering the target digital video using the full rendering engine.

A scene specification may include different types of variants including, but not limited, (a) layout variants in which the placeholders of the scene specification have different layouts with respect to other media elements presented on the screen, and (b) animation variants such as, for example, a media element that either slides across the screen in a certain direction, fades in, fades in and then fades out, or other animation.

Anchor Variants

According to some embodiments, the designer of a scene specification may specify a set of one or more predefined anchors for a media element placeholder of the scene specification. An anchor is a fixed position on the screen where the media element is displayed during a scene. Through the storyboard interface, the lay user can select one of the predefined anchors made available by the designer for a given media element. For example, in UI 1001 of FIG. 10, the text positions selectable through interactive controls 1006 may correspond to three different predefined anchors for the text asset 1005.

By limiting where the lay user can anchor media elements, the designer of the underlying design animation module can retain some creative control over how the target digital video will look while at the same time providing some flexibility to the lay user in where media elements are positioned on the screen.

In some embodiments, an anchor position for a media element interactive controls just the initial position for the media element when first displayed in the target digital video as part of the corresponding scene. The position of the media element in the scene may then change thereafter as result of an animation effect.

Placeholder and Media Element Scaling

A scene specification can have one or more media element placeholders. Each such placeholder may receive a corresponding type of media element configured by the lay user through the storyboard interface and through the storyboard block corresponding to the scene specification. Each placeholder may be replaced by a media element provided by the lay user before the target digital video is rendered by the full rendering engine based on the design animation module.

According to some embodiments, when designing a scene specification, the designer can specify one of two scaling options for a placeholder of the scene specification.

According to a first one of the two options, sometimes referred to as "in-placeholder scaling", a media element provided by the lay user is scaled to fit the designer-specified bounds of the placeholder. For example, a designer may specify the dimensions of a placeholder for a background image to be a certain pixel width X and a certain pixel height Y. If the end-user provides a digital image that does not fit those dimensions, then the digital image may be scaled up or scaled down as appropriate but the dimensions X and Y of the placeholder are not changed.

According to a second on of the two options, sometimes referred to as "overall placeholder scaling", the placeholder is scaled up or down as appropriate to fit the dimensions of the media element provided by the lay user. In some instances, the designer may specify maximum and minimum bounds that the placeholder will be scaled up or scaled down, respectively. In these instances, the placeholder will scale up or down, as appropriate, to fit the dimensions of the media element provided by the end-user but will not exceed the maximum or minimum bounds.

By limiting how placeholders and media elements are scaled, the designer of the underlying scene specification can retain some creative control to ensure a professional-quality target digital video while at the same time providing some flexibility to the lay user in scaling the placeholders and media elements.

Voiceover Timing

The lay user can provide an audio voiceover to accompany a scene. According to some embodiments, the server-side builder tool, when configuring the full rendering engine to generate the target digital video, causes the voiceover to begin playing at the beginning of the animated transition to the scene, as opposed to causing the voiceover to begin paying later in the scene (e.g., after the transition to the incoming scene has completed.) To accomplish this, in some embodiments, audio silence, if any, at the beginning of the voiceover is detected and removed. Then, the server-side builder tool generates the target digital video such that the beginning of the voiceover starts as the transition to the incoming scene begins. The result is an impression on the viewer of the target digital video that the voiceover is "driving" the transition, and overall results in a more fluid voiceover mix.

Sample Operation

The following description presents method steps that may be implemented using computer-executable instructions, for directing operation of one or more devices under processor control. Some or all of the computer-executable instructions may be stored on a non-transitory computer-readable medium, such as hard disk, CD, DVD, flash memory, or the like. Further, some or all the computer-executable instructions may also be stored as a set of downloadable computer-executable instructions, for example, for downloading and installation from an Internet location (e.g., Web server).

According to some embodiments, various method steps are performed by different devices. For example, some of the steps may be performed by a personal computing device operated by the lay user (e.g., a desktop, laptop, tablet, or mobile phone) while other steps may be performed by one or more server computing devices operatively coupled to the personal computing device via a data network (e.g., the Internet). In the following description, it will be assumed that some of the steps are performed by a personal computing device of a lay user and other steps are performed by one or more server computing devices used, controlled, or operated by an online service. However, in other embodiments, all of the method steps are performed by the personal computing device or all of the method steps are performed by the server computing device(s) of the online service.

While certain method steps may be shown in the drawings and described herein as being performed in a certain order, the steps are not necessarily limited to being performed in that order. Unless the context clearly indicates otherwise, the method steps may be performed in any order, including concurrently with one another, according to the requirements of the particular implementation at hand. Further, unless the context clearly indicates otherwise, it is not intended that all of the method steps are required in an implementation and some steps may be omitted or modified according to the requirements of the particular implementation at hand.

Figure 15:
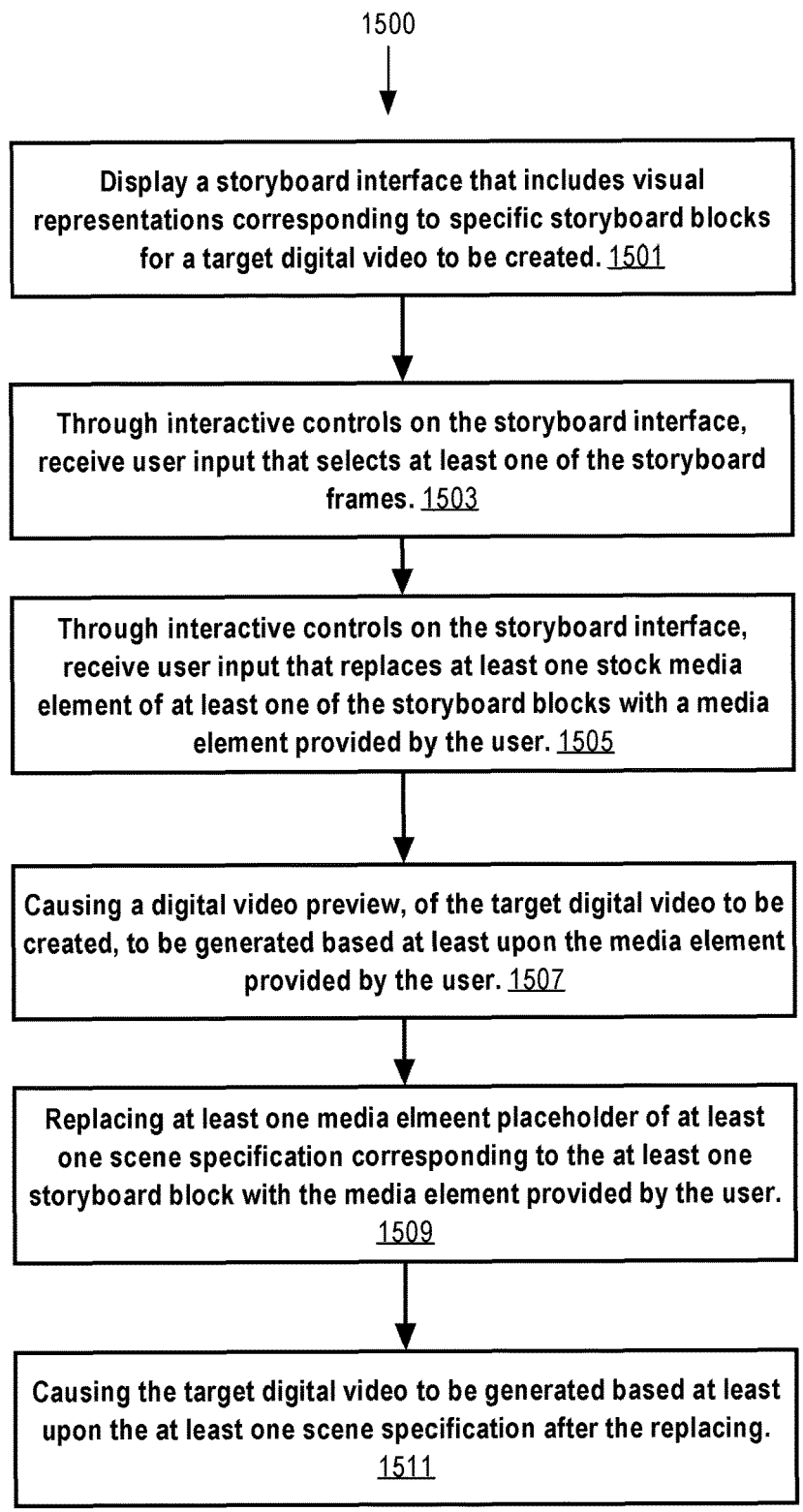
FIG. 15 comprises a flowchart illustrating operation of the digital video builder tool according to various embodiments of the present invention.

FIG. 15 comprises a flowchart 1500 illustrating operation of the digital video builder tool according to an embodiment of the subject innovations. The method of operation starts at step 1501, with the tool displaying a storyboard interface that includes visual representations corresponding to specific storyboard blocks for a target digital video to be created. For example, storyboard interface 801 includes visual representations 802 corresponding to specific storyboard blocks of a storyboard for a target digital video to be created. The visual representations 802 of the specific storyboard blocks are displayed in the storyboard interface 801 in a certain left-to-right order. The certain order reflects a current order of the specific storyboard blocks in the storyboard. If the target digital video were generated based on the current order, then scenes of the target digital video corresponding to the specific storyboard blocks would be played in an order that corresponds to the current order of the specific storyboard blocks.

At step 1503, the tool receives, through interactive controls on the storyboard interface, user input that selects at least one of the storyboard blocks. For example, the user may select the storyboard block represented by visual representation 802 in the storyboard interface 801 by directing user input to the visual representation 802. In response to the user input, the static visual representation 803 of the current storyboard block configuration is represented in the storyboard interface 801.

At step 1505, the tool receives, through interactive controls on the storyboard interface, user input that replaces at least one stock media element of at least one of the storyboard blocks with a media element provided by the user. For example, the user may replace the background image 904 or the logo image 905 of the storyboard block currently selected in the storyboard interface 901 by dragging and dropping a digital image file on an area of the storyboard interface 901 where the image to be replaced is displayed.

At step 1507, the tool causes a digital video preview of the target digital video to be created to be generated based at least upon the media element provided by the user. According to some embodiments, the tool does this by using a JAVASCRIPT application programming interface for rendering computer graphics in a compatible web browser to generate the digital video preview (or at least a portion thereof). In some implementations, the JAVASCRIPT API is WebGL or the like.

At step 1509, the tool automatically replaces at least one media element placeholder of at least one scene specification with the media element provided by the user. For example, the tool may automatically replace the media element placeholder with the media element provided by the user in response to receiving, through interactive controls on the storyboard interface, user input that commands the tool to generate the target digital video.

At step 1511, the tool causes the target digital video to be generated based at least upon one scene specification corresponding to a storyboard block in which a stock media element of the storyboard block has been replaced by a user-supplied one. To do this, the tool may invoke video rendering engine to render the target digital video based at least upon the scene specification. According to some embodiments, the target digital video, when played, shows at least one animated effect applied to a user-supplied media element that is not shown when the digital video preview is played.

Basic Computing Device

Referring now to FIG. 16, it is a block diagram that illustrates a basic computing device 1600 in which software-implemented processes of the subject innovations may be embodied. Computing device 1600 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 1600 may include a bus 1602 or other communication mechanism for addressing main memory 1606 and for transferring data between and among the various components of device 1600.

Computing device 1600 may also include one or more hardware processors 1604 coupled with bus 1602 for processing information. A hardware processor 1604 may be a general purpose microprocessor, a system on a chip (SoC), or other processor suitable for implementing the subject innovations.

Main memory 1606, such as a random access memory (RAM) or other dynamic storage device, also may be coupled to bus 1602 for storing information and instructions to be executed by processor(s) 1604. Main memory 1606 also may be used for storing temporary variables or other intermediate information during execution of software instructions to be executed by processor(s) 1604.

Such software instructions, when stored in non-transitory storage media accessible to processor(s) 1604, render computing device 1600 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1600 also may include read only memory (ROM) 1608 or other static storage device coupled to bus 1602 for storing static information and instructions for processor(s) 1604.

One or more mass storage devices 1610 may be coupled to bus 1602 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1610 (e.g., the main hard disk for the device) stores a body of program and data for directing operation of the computing device, including an operating system, user application programs, driver and other support files, as well as other data files of all sorts.

Computing device 1600 may be coupled via bus 1602 to display 1612, such as a liquid crystal display (LCD) or other electronic visual display, for displaying information to a computer user. In some configurations, a touch sensitive surface incorporating touch detection technology (e.g., resistive, capacitive, etc.) may be overlaid on display 1612 to form a touch sensitive display for communicating touch gesture (e.g., finger or stylus) input to processor(s) 1604.

An input device 1614, including alphanumeric and other keys, may be coupled to bus 1602 for communicating information and command selections to processor 1604. In addition to or instead of alphanumeric and other keys, input device 1614 may include one or more physical buttons or switches such as, for example, a power (on/off) button, a "home" button, volume control buttons, or the like.

Another type of user input device may be a cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

While in some configurations, such as the configuration depicted in FIG. 16, one or more of display 1612, input device 1614, and cursor control 1616 are external components (i.e., peripheral devices) of computing device 1600, some or all of display 1612, input device 1614, and cursor control 1616 are integrated as part of the form factor of computing device 1600 in other configurations.

Functions of the disclosed systems, methods, and modules may be performed by computing device 1600 in response to processor(s) 1604 executing one or more programs of software instructions contained in main memory 1606. Such instructions may be read into main memory 1606 from another storage medium, such as storage device(s) 1610. Execution of the software program instructions contained in main memory 1606 cause processor(s) 1604 to perform the functions of the disclosed systems, methods, and modules.

While in some implementations, functions of the disclosed systems and methods are implemented entirely with software instructions, hard-wired or programmable circuitry of computing device 1600 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1610. Volatile media includes dynamic memory, such as main memory 1606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor(s) 1604 for execution. For example, the instructions may initially be carried on a magnetic disk or solid-state drive of a remote computer. The remote computer can load the instructions into its dynamic memory and send the instructions over a telephone line using a modem. A modem local to computing device 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor(s) 1604 retrieves and executes the instructions. The instructions received by main memory 1606 may optionally be stored on storage device(s) 1610 either before or after execution by processor(s) 1604.

Computing device 1600 also may include one or more communication interface(s) 1618 coupled to bus 1602. A communication interface 1618 provides a two-way data communication coupling to a wired or wireless network link 1620 that is connected to a local network 1622 (e.g., Ethernet network, Wireless Local Area Network, cellular phone network, Bluetooth wireless network, or the like). Communication interface 1618 sends and receives electrical, electromagnetic, or optical signals that carry digital data streams representing various types of information. For example, communication interface 1618 may be a wired network interface card, a wireless network interface card with an integrated radio antenna, or a modem (e.g., ISDN, DSL, or cable modem).

Network link(s) 1620 typically provide data communication through one or more networks to other data devices. For example, a network link 1620 may provide a connection through a local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network(s) 1622 and Internet 1628 use electrical, electromagnetic or optical signals that carry digital data streams. The signals through the various networks and the signals on network link(s) 1620 and through communication interface(s) 1618, which carry the digital data to and from computing device 1600, are example forms of transmission media.

Computing device 1600 can send messages and receive data, including program code, through the network(s), network link(s) 1620 and communication interface(s) 1618. In the Internet example, a server 1630 might transmit a requested code for an application program through Internet 1628, ISP 1626, local network(s) 1622 and communication interface(s) 1618.

The received code may be executed by processor 1604 as it is received, and/or stored in storage device 1610, or other non-volatile storage for later execution.

Basic Software System

Figure 17:
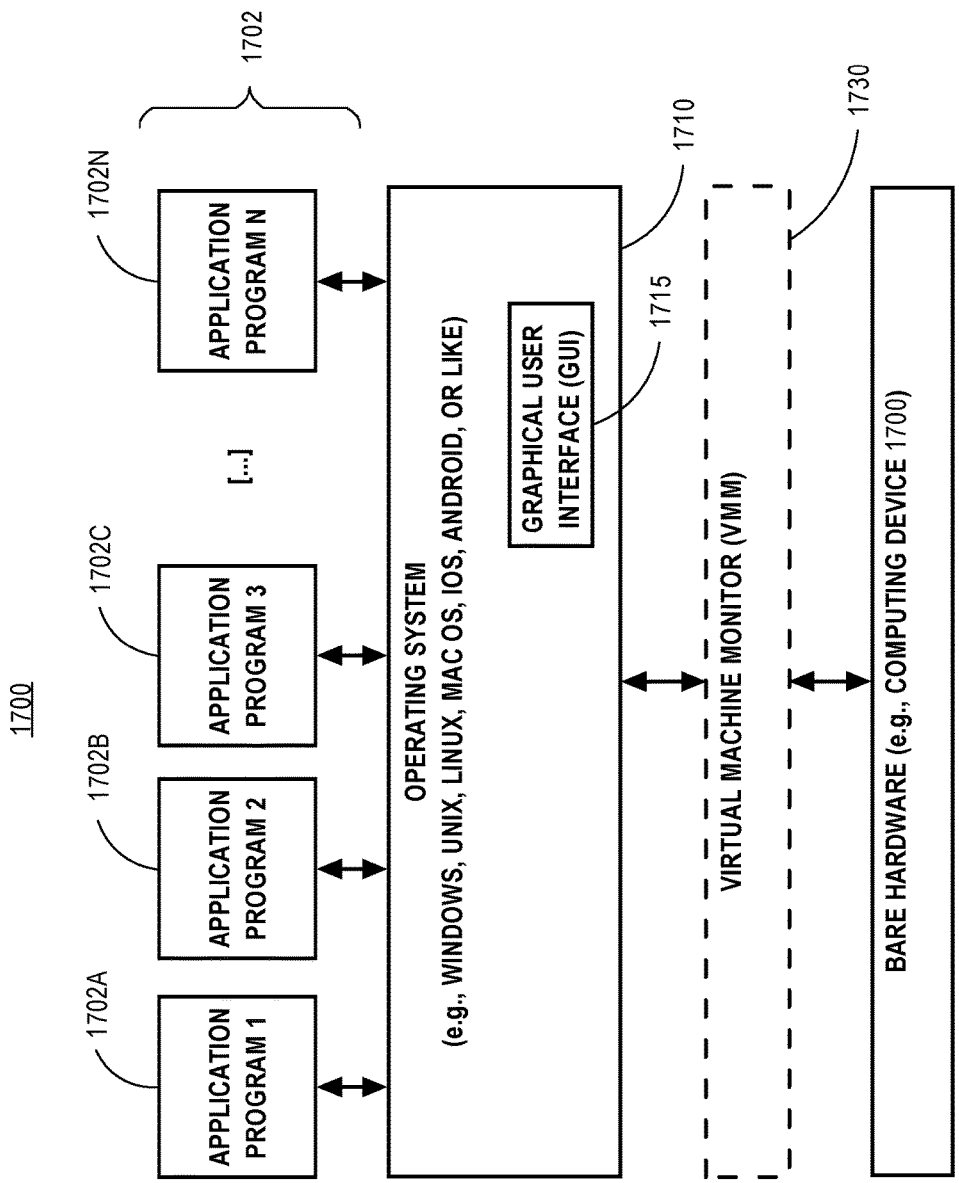
FIG. 17 is a block diagram of an example software system suitable for implementing the digital video builder tool with storyboard interface of the present invention.

FIG. 17 is a block diagram of a basic software system 1700 that may be employed for controlling the operation of computing device 1600. Software system 1700 and its components, including their connections, relationships, and functions, is meant to be exemplary only, and not meant to limit implementations of the subject innovations. Other software systems suitable for implementing the subject innovations may have different components, including components with different connections, relationships, and functions.

In various embodiments, software system 1700 is provided for directing the operation of computing device 1600. Software system 1700, which may be stored in system memory (RAM) 1606 and on fixed storage (e.g., hard disk or flash memory) 1610, includes a kernel or operating system (OS) 1710. The OS 1710 manages low-level aspects of computer operation, including managing execution of processes, memory allocation, file input and output (I/O), and device I/O. One or more application programs, represented as 1702A, 1702B, 1702C . . . 1702N in FIG. 17, may be "loaded" (e.g., transferred from fixed storage 1610 into memory 1606) for execution by the system 1700. The applications or other software intended for use on device 1700 may also be stored as a set of downloadable computer-executable instructions, for example, for downloading and installation from an Internet location (e.g., a Web server).

Software system 1700 may include a graphical user interface (GUI) 1715, for receiving user commands and data in a graphical (e.g., "point-and-click" or "touch gesture") fashion. These inputs, in turn, may be acted upon by the system 1700 in accordance with instructions from operating system 1710 and/or application(s) 1702. The GUI 1715 also serves to display the results of operation from the OS 1710 and application(s) 1702, whereupon the user may supply additional inputs or terminate the session (e.g., log off).

OS 1710 can execute directly on the bare hardware 1720 (e.g., processor(s) 1604) of device 1600. Alternatively, a hypervisor or virtual machine monitor (VMM) 1730 may be interposed between the bare hardware 1720 and the OS 1710. In this configuration, VMM 1730 acts as a software "cushion" or virtualization layer between the OS 1710 and the bare hardware 1720 of the device 1600.

VMM 1730 instantiates and runs one or more virtual machine instances ("guest machines"). Each guest machine comprises a "guest" operating system, such as OS 1710, and one or more applications, such as application(s) 1702, designed to execute on the guest operating system. The VMM 1730 presents the guest operating systems with a virtual operating platform and manages the execution of the guest operating systems.

In some instances, the VMM 1730 may allow a guest operating system to run as if it is running on the bare hardware 1720 of device 1600 directly. In these instances, the same version of the guest operating system configured to execute on the bare hardware 1720 directly may also execute on VMM 1730 without modification or reconfiguration. In other words, VMM 1730 may provide full hardware and CPU virtualization to a guest operating system in some instances.

In other instances, a guest operating system may be specially designed or configured to execute on VMM 1730 for efficiency. In these instances, the guest operating system is "aware" that it executes on a virtual machine monitor. In other words, VMM 1730 may provide para-virtualization to a guest operating system in some instances.

The above-described basic computer hardware and software is presented for purpose of illustrating the basic underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Extensions and Alternatives

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

The invention claimed is:

1. A method, comprising:
receiving, via interactive controls of a graphical user interface, configuration of a storyboard block for a target digital video to be created;
wherein the storyboard block (a) represents a scene of the target digital video to be created, (b) comprises a scene parameter, and (c) is a compiled version of a scene specification, having a plurality of scene variants, for rendering the scene of the target digital video;
wherein the received configuration comprises a user setting for the scene parameter;
based on the scene parameter user setting, automatically selecting a particular scene variant of the plurality of scene variants for use in rendering the scene of the target digital video;
wherein the scene of the target digital video is rendered based on the particular scene variant automatically selected.

2. The method of claim 1, the method further comprising:
receiving, via interactive controls of a graphical user interface, a request to render the target digital video; and
causing the scene of the target digital video to be rendered based on the selected scene variant.

3. The method of claim 1, wherein the scene specification comprises a scene graph; wherein each scene variant of the plurality of scene variants comprises metadata about the scene graph and identifies a different scene sub-graph of the scene graph; and wherein the target digital video is rendered based on the scene sub-graph identified by the selected scene variant.

4. The method of claim 1, wherein the scene specification comprises metadata specifying a plurality of possible settings for the scene parameter; and wherein the interactive controls of the graphical user interface allow selection of one setting of the plurality of possible settings.

5. The method of claim 1, wherein:
the scene parameter is a first scene parameter;
the storyboard block comprises a media element slot and a second scene parameter for configuring the media element slot;
the scene specification comprises metadata specifying a plurality of possible settings for the first scene parameter and specifying a plurality of possible settings for the second scene parameter;
the scene specification further comprises metadata specifying one or more allowable possible settings of the plurality of possible settings for the first scene parameter if a particular possible setting of the plurality of possible settings for the second scene parameter is selected;
the interactive controls of the graphical user interface allow selection of the particular possible setting of the plurality of possible settings for the second scene parameter; and
the interactive controls of the graphical user interface allow selection of only the one or more allowable possible settings of the plurality of possible settings for the first scene parameter when the particular possible setting is selected via the interactive controls for the second scene parameter.

6. The method of claim 1, the method further comprising:
receiving, via interactive controls of a graphical user interface, a request to render a preview of the target digital video; and
causing the preview of the target digital video to be rendered based on the scene parameter setting.

7. The method of claim 6, wherein the preview is rendered in a web browser.

8. The method of claim 6, wherein the preview is rendered at a client and wherein the target digital video is rendered at a server of the client.

9. The method of claim 1, wherein the scene parameter setting selects one of a plurality of predefined anchor positions in the scene for a text element or a media element.

10. The method of claim 9, wherein the plurality of predefined anchor positions in the scene for the text element or the media element are specified in the scene specification.

11. The method of claim 1, further comprising:
based on the scene parameter setting, selecting a plurality of the plurality of scene variants for use in rendering the scene of the target digital video.

12. A system, comprising:
one or more processors;
one or more storage media storing one or more computer programs for execution by the one or more processors, the one or more computer programs comprising instructions for:
receiving, via interactive controls of a graphical user interface, configuration of a storyboard block for a target digital video to be created;
wherein the storyboard block (a) represents a scene of the target digital video to be created, (b) comprises a scene parameter, and (c) is a compiled version of a scene specification, having a plurality of scene variants, for rendering the scene of the target digital video;
wherein the received configuration comprises a user setting for the scene parameter;
based on the scene parameter user setting, automatically selecting a particular scene variant of the plurality of scene variants for use in rendering the scene of the target digital video;

wherein the scene of the target digital video is rendered based on the particular scene variant automatically selected.

13. The system of claim 12, the instructions further comprising instructions for:
receiving, via interactive controls of a graphical user interface, a request to render the target digital video; and
causing the scene of the target digital video to be rendered based on the selected scene variant.

14. The system of claim 12, wherein the scene specification comprises a scene graph; wherein each scene variant of the plurality of scene variants comprises metadata about the scene graph and identifies a different scene sub-graph of the scene graph; and wherein the target digital video is rendered based on the scene sub-graph identified by the selected scene variant.

15. The system of claim 12, wherein the scene specification comprises metadata specifying a plurality of possible settings for the scene parameter; and wherein the interactive controls of the graphical user interface allow selection of one setting of the plurality of possible settings.

16. The system of claim 12, wherein:
the scene parameter is a first scene parameter;
the storyboard block comprises a media element slot and a second scene parameter for configuring the media element slot;
the scene specification comprises metadata specifying a plurality of possible settings for the first scene parameter and specifying a plurality of possible settings for the second scene parameter;
the scene specification further comprises metadata specifying one or more allowable possible settings of the plurality of possible settings for the first scene parameter if a particular possible setting of the plurality of possible settings for the second scene parameter is selected;
the interactive controls of the graphical user interface allow selection of the particular possible setting of the plurality of possible settings for the second scene parameter; and
the interactive controls of the graphical user interface allow selection of only the one or more allowable possible settings of the plurality of possible settings for the first scene parameter when the particular possible setting is selected via the interactive controls for the second scene parameter.

17. The system of claim 12, the instructions further comprising instructions for:
receiving, via interactive controls of a graphical user interface, a request to render a preview of the target digital video; and
causing the preview of the target digital video to be rendered based on the scene parameter setting.

18. The system of claim 17, wherein the preview is rendered in a web browser.

19. The system of claim 17, wherein the preview is rendered at a client and wherein the target digital video is rendered at a server of the client.

20. The system of claim 12, wherein the scene parameter setting selects one of a plurality of predefined anchor positions in the scene for a text element or a media element.

21. The system of claim 20, wherein the plurality of predefined anchor positions in the scene for the text element or the media element are specified in the scene specification.

22. The system of claim 12, the instructions further comprising instructions for:
based on the scene parameter setting, selecting a plurality of the plurality of scene variants for use in rendering the scene of the target digital video.

* * * * *